US012179482B2

(12) United States Patent
Okuwa

(10) Patent No.: US 12,179,482 B2
(45) Date of Patent: Dec. 31, 2024

(54) LIQUID DROPLET DISCHARGE APPARATUS, LIQUID DROPLET DISCHARGE METHOD, AND MEDIUM STORING LIQUID DROPLET DISCHARGE PROGRAM

(71) Applicant: BROTHER KOGYO KABUSHIKI KAISHA, Nagoya (JP)

(72) Inventor: Hiroya Okuwa, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 163 days.

(21) Appl. No.: 17/937,909

(22) Filed: Oct. 4, 2022

(65) Prior Publication Data

US 2023/0129982 A1 Apr. 27, 2023

(30) Foreign Application Priority Data

Oct. 25, 2021 (JP) ................................ 2021-173811

(51) Int. Cl.
*B41J 2/045* (2006.01)

(52) U.S. Cl.
CPC ......... *B41J 2/04588* (2013.01); *B41J 2/0451* (2013.01); *B41J 2203/011* (2020.08)

(58) Field of Classification Search
CPC . B41J 2/04588; B41J 2/0451; B41J 2203/011
See application file for complete search history.

(56) References Cited

FOREIGN PATENT DOCUMENTS

| | | | | |
|---|---|---|---|---|
| CN | 110421969 A | * 11/2019 | .......... B41J 2/17509 |
| CN | 115008901 A | * 9/2022 | |
| JP | 2012-129823 A | 7/2012 | |

* cited by examiner

*Primary Examiner* — Justin Seo
(74) *Attorney, Agent, or Firm* — Merchant & Gould P.C.

(57) ABSTRACT

A liquid droplet discharge apparatus includes a discharge head having a nozzle for discharging liquid droplets onto a printing medium and an actuator for applying pressure to liquid in a pressure chamber communicated with the nozzle; a waveform generating circuit for generating driving waveforms of signals for driving the actuator; a surface information acquiring device configured to acquire information about a surface of the printing medium; and a controller. The controller calculates a volume of a recess on the printing medium based on the information acquired by the surface information acquiring device; causes the waveform generating circuit to generate a driving waveform for filling up the recess in accordance with the volume of the recess; and drives the actuator in accordance with the driving waveform generated by the waveform generating circuit such that the liquid droplets are discharged from the nozzle to the recess.

11 Claims, 16 Drawing Sheets

LIQUID DROPLET DISCHARGE APPARATUS, LIQUID DROPLET DISCHARGE METHOD, AND MEDIUM STORING LIQUID DROPLET DISCHARGE PROGRAM

REFERENCE TO RELATED APPLICATIONS

This application claims priority from Japanese Patent Application No. 2021-173811 filed on Oct. 25, 2021. The entire content of the priority application is incorporated herein by reference.

BACKGROUND ART

A technique has been hitherto known, in which a crack or scratch is restored or repaired on an image printed on a printing medium. For example, an ink-jet printer is known, in which position information of a crack on a printing medium is acquired, an ink amount required to fill up the crack is estimated, and then an ink is discharged onto the crack.

DESCRIPTION

However, when ink droplets are discharged with respect to the crack on the printing medium, if the ink droplets having an identical liquid droplet size are discharged, then the estimated ink amount is in deficiency with respect to the volume of the crack, or the estimated ink amount is in excess with respect to the volume of the crack.

In view of the above, an object of the present disclosure is to provide a liquid droplet discharge apparatus, a liquid droplet discharge method, and a medium stored with a liquid droplet discharge program which make it possible to fill up a recess on a printing medium in a short period of time by using a liquid in an amount more appropriate to a volume thereof.

According to an aspect of the present disclosure, there is provided a liquid droplet discharge apparatus including a discharge head having a nozzle and an actuator, the nozzle being configured to discharge liquid droplets onto a printing medium, the actuator being configured to apply pressure to liquid contained in a pressure chamber communicated with the nozzle; a waveform generating circuit configured to generate driving waveforms of signals for driving the actuator; a surface information acquiring device configured to acquire information about a surface of the printing medium; and a controller, wherein the controller is configured to calculate a volume of a recess on the printing medium based on first information about the surface of the printing medium acquired by the surface information acquiring device; cause the waveform generating circuit to generate a driving waveform for filling up the recess in accordance with the volume of the recess; and perform restoration of the recess by driving the actuator in accordance with the driving waveform generated by the waveform generating circuit such that the liquid droplets are discharged from the nozzle to the recess.

According to the present disclosure, the volume of the recess on the printing medium is calculated by the controller based on the first information about the surface of the printing medium acquired by the surface information acquiring device. Accordingly, it is possible to obtain the correct volume of the recess. Then, the controller executes the recess restoring process in which the actuator is driven in accordance with the driving waveform generated by the waveform generating circuit. In this way, the driving waveform, which corresponds to the volume of the recess on the printing medium, is used. Therefore, it is possible to fill up the recess without any excess or any deficiency. On this account, it is possible to avoid any excessive discharge of the liquid droplets with respect to the recess. Therefore, it is possible to fill up the recess in a period of time shorter than that required in the conventional technique.

According to the present disclosure, it is possible to provide the liquid droplet discharge apparatus, the liquid droplet discharge method, and the medium storing the liquid droplet discharge program which make it possible to suppress the deterioration of the image quality.

Figure 6:
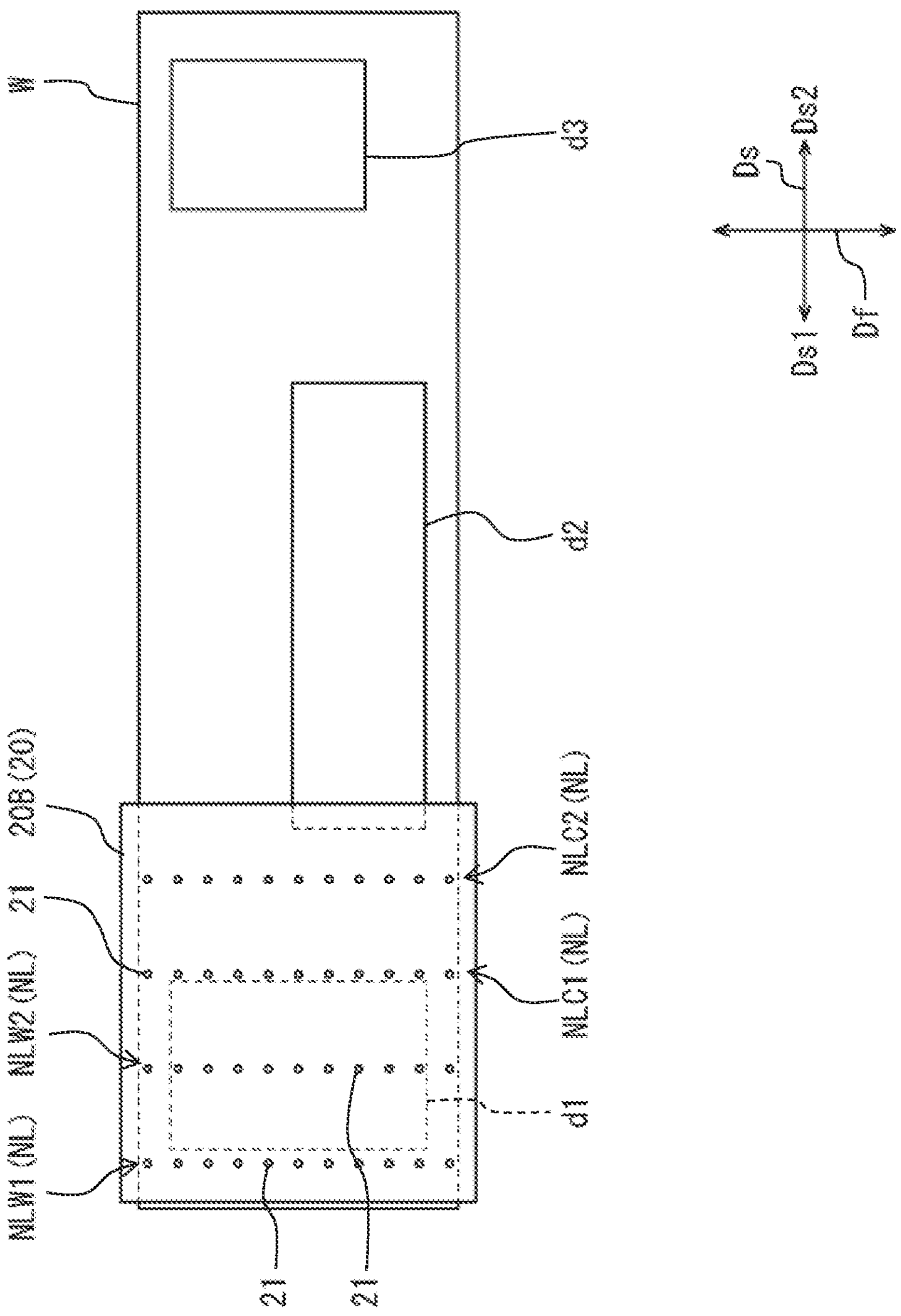

FIG. 6 explains the moving discharge time and the stop discharge time provided when a first recess on the printing medium is filled up.

Figure 7:
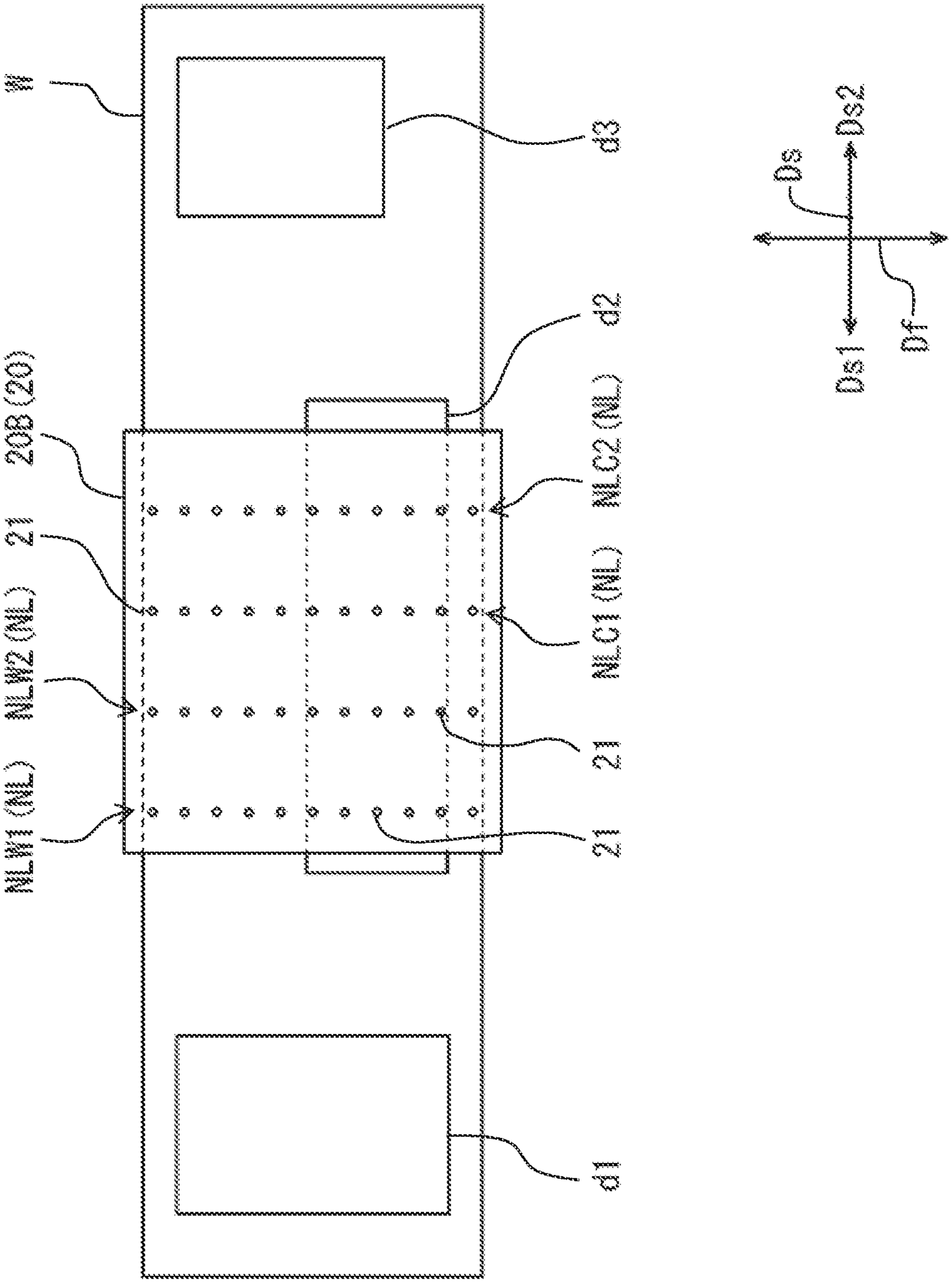

FIG. 7 explains the moving discharge time and the stop discharge time provided when a second recess on the printing medium is filled up.

Figure 8:
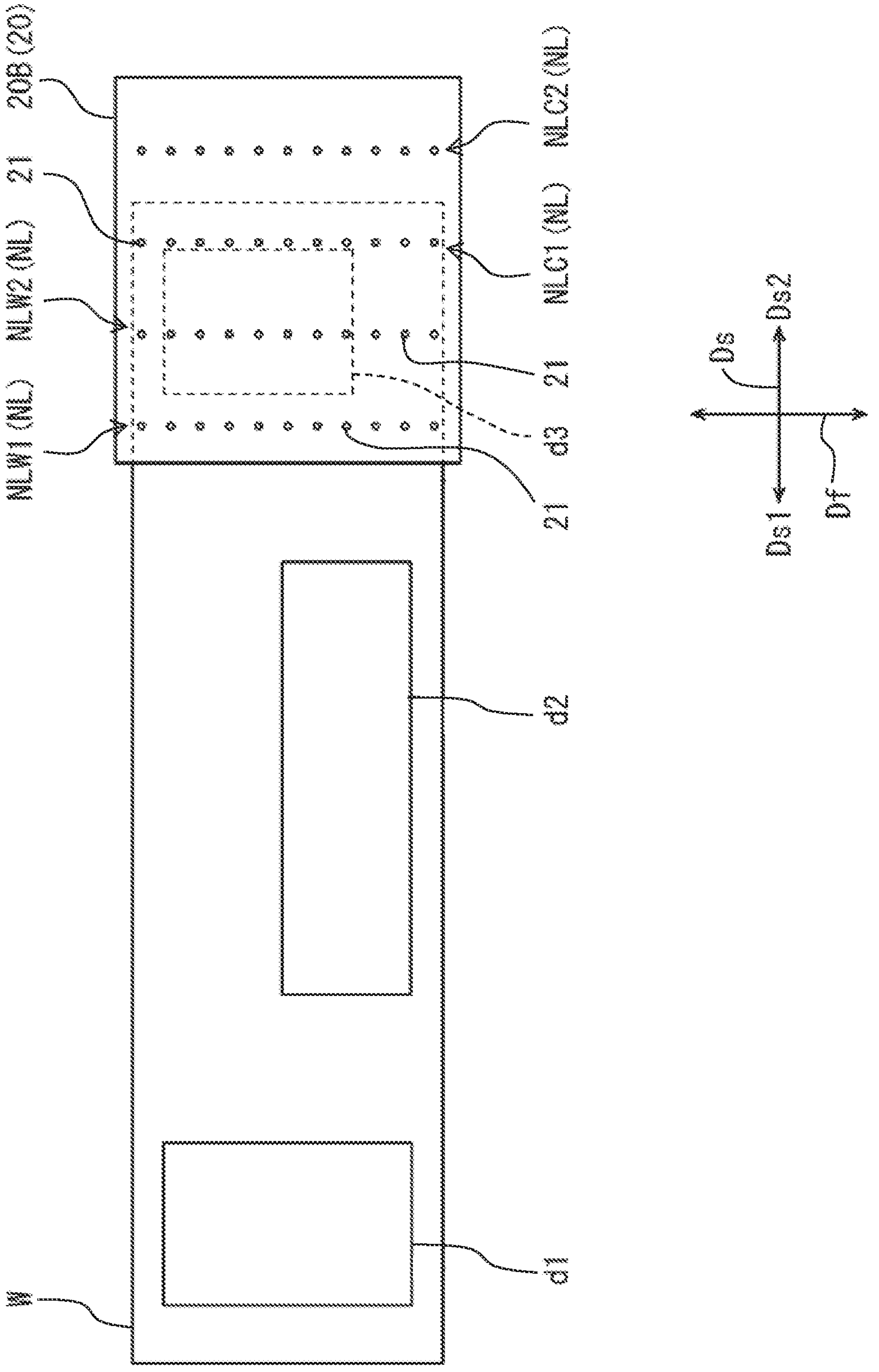

FIG. 8 explains the moving discharge time and the stop discharge time provided when a third recess on the printing medium is filled up.

Figure 9:
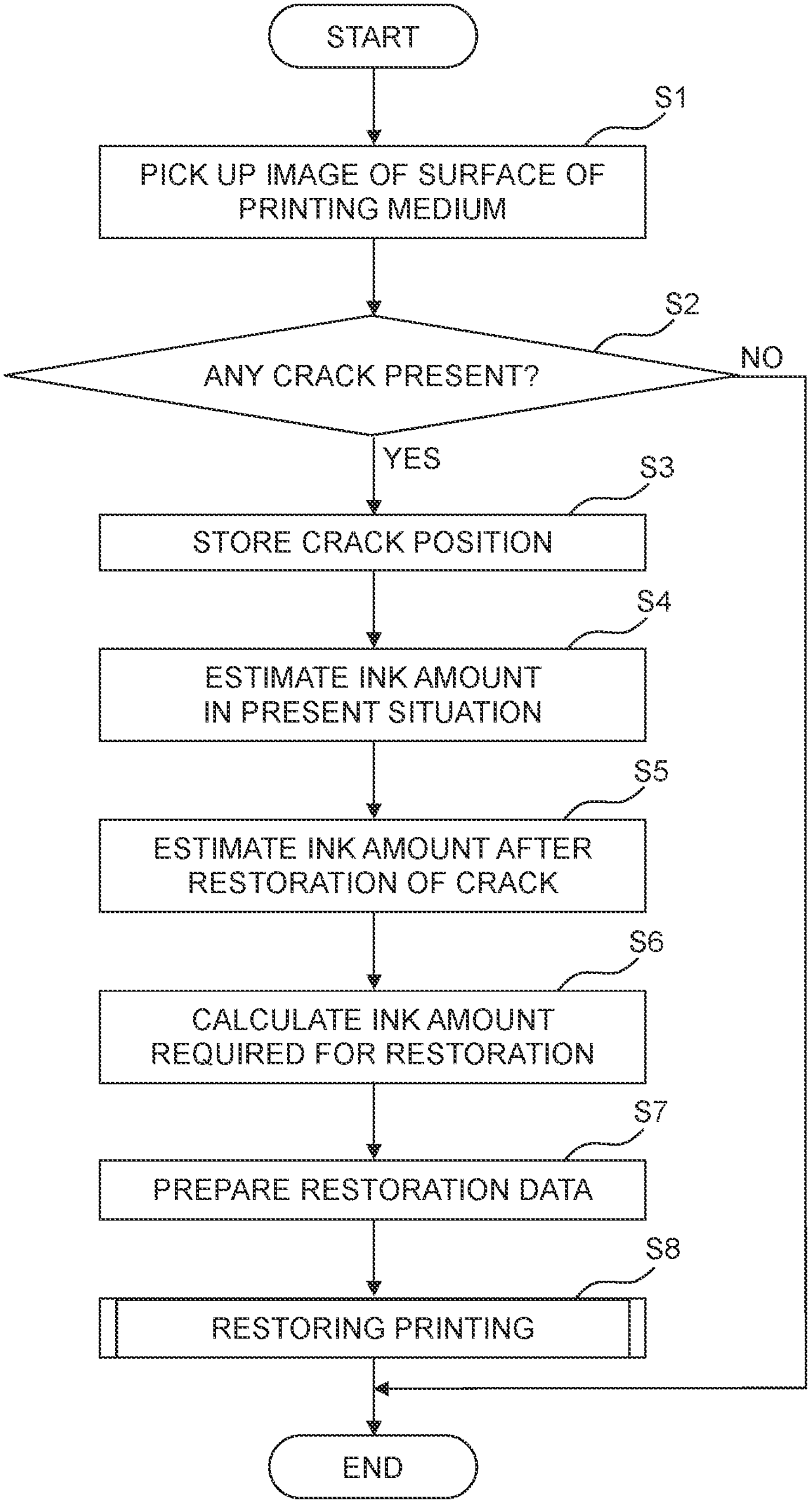

FIG. 9 is a flow chart illustrative of a main routine of a recess restoring process performed by a controller.

Figure 10:
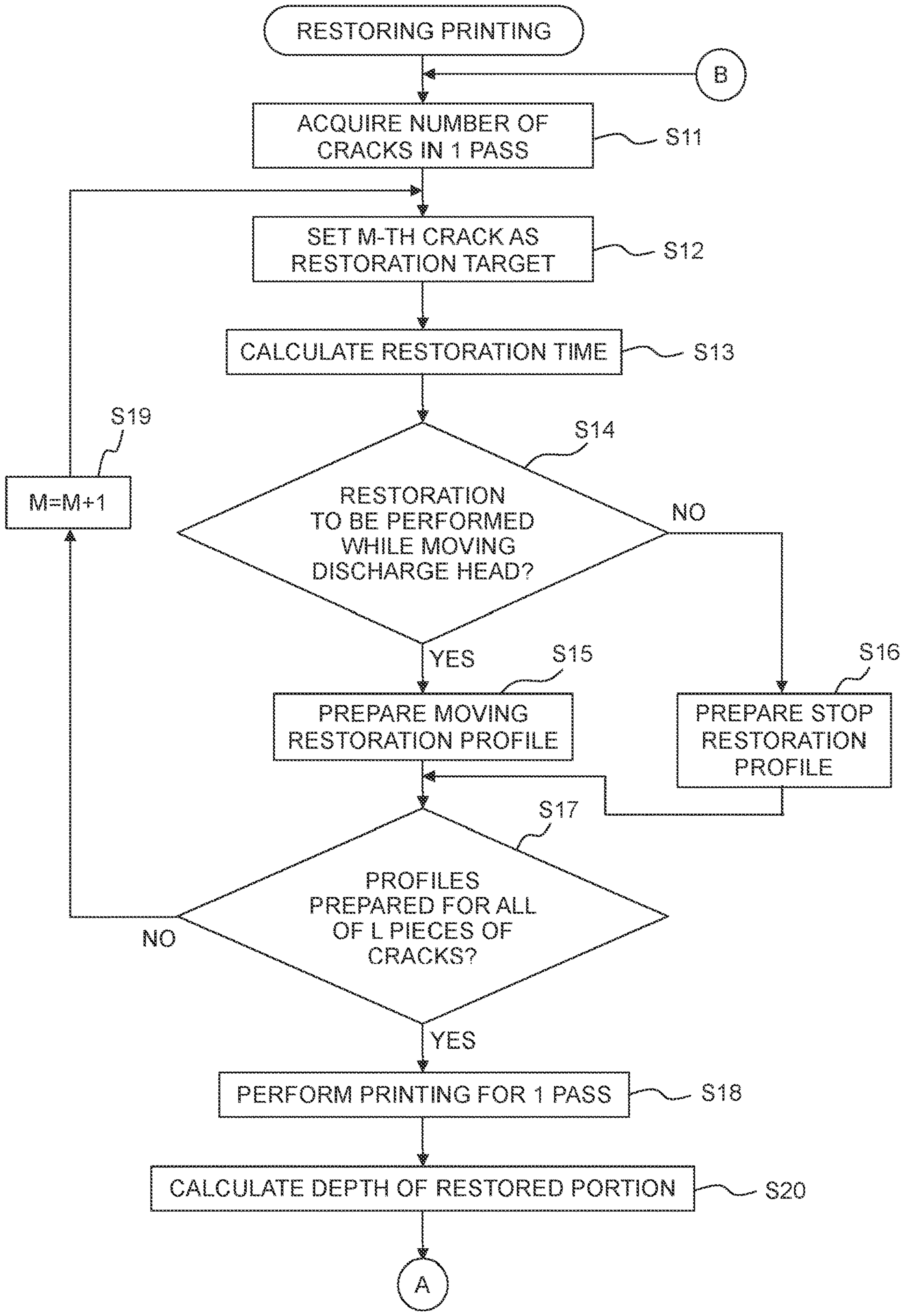

FIG. 10 is a flow chart illustrative of an example of a part of a subroutine of restoring printing depicted in FIG. 9.

Figure 11:
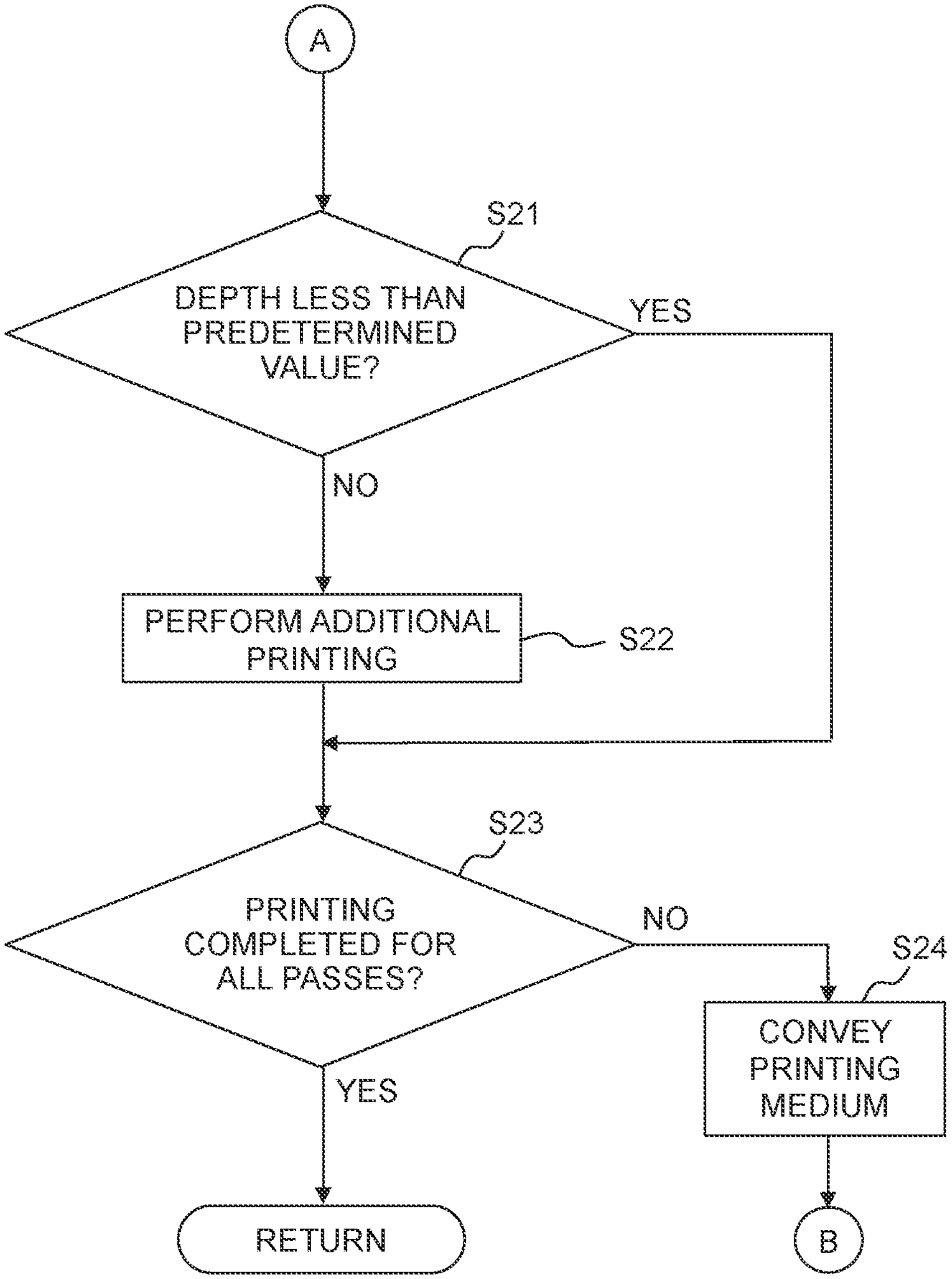

FIG. 11 is a flow chart illustrative of an example of the remaining part of the subroutine of the restoring printing depicted in FIG. 9.

Figure 12:
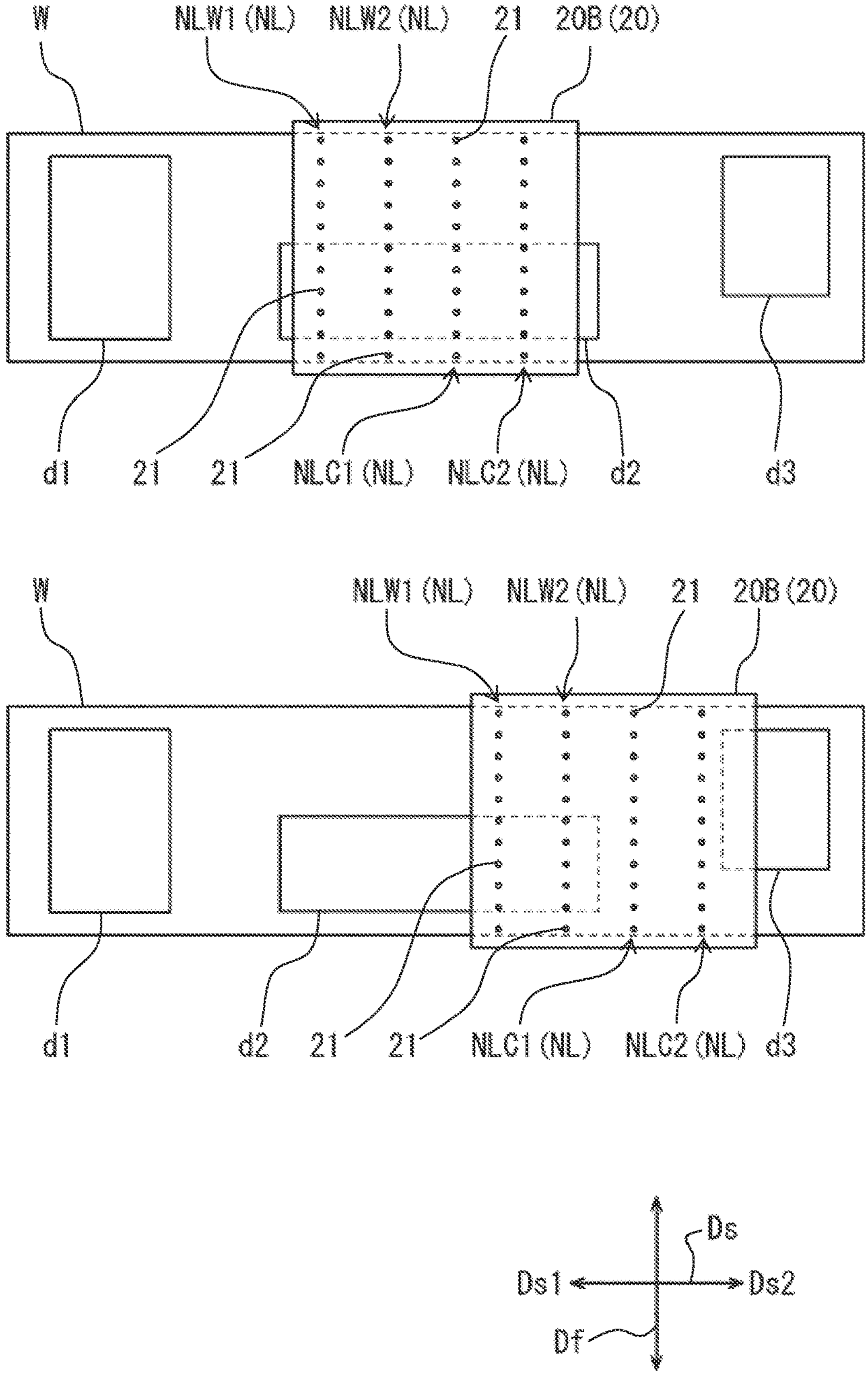

FIG. 12 are illustrative of positional relationships between the discharge head and the recess provided when the discharge head is stopped twice during the printing for the recess.

Figure 13:
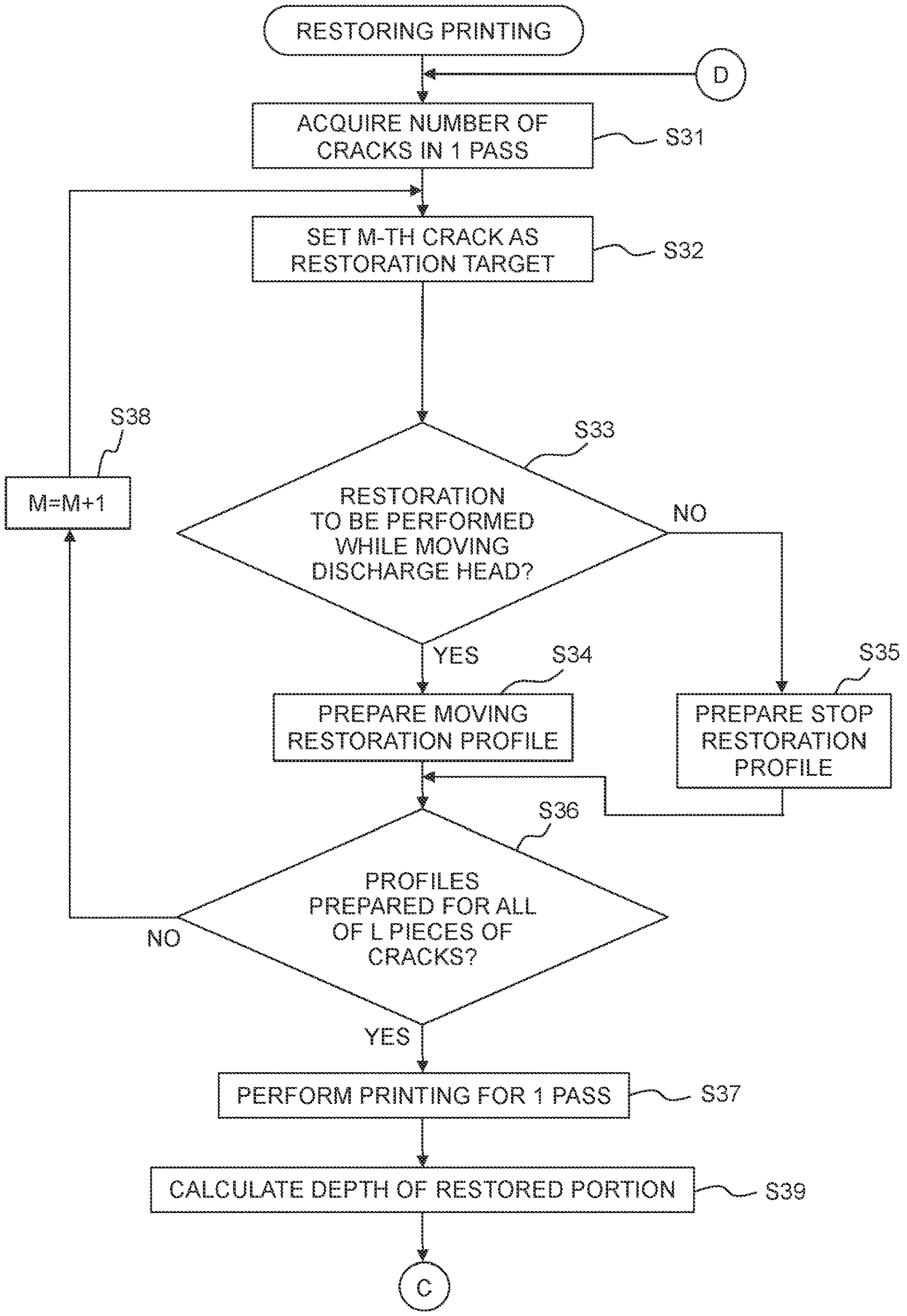

FIG. 13 is a flow chart illustrative of an example of a part of a subroutine of restoring printing.

Figure 14:
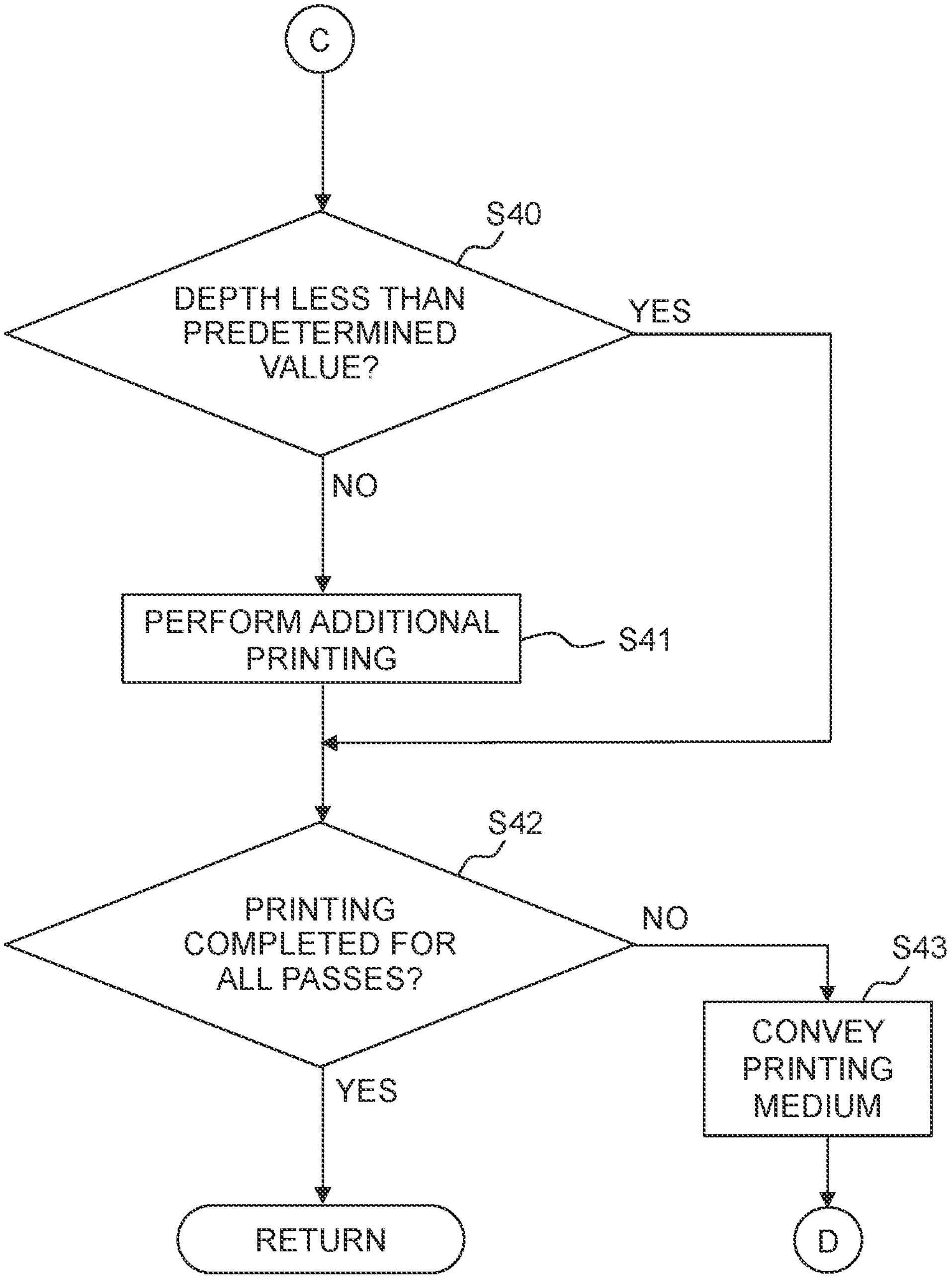

FIG. 14 is a flow chart illustrative of an example of the remaining part of the subroutine of the restoring printing.

Figure 15:
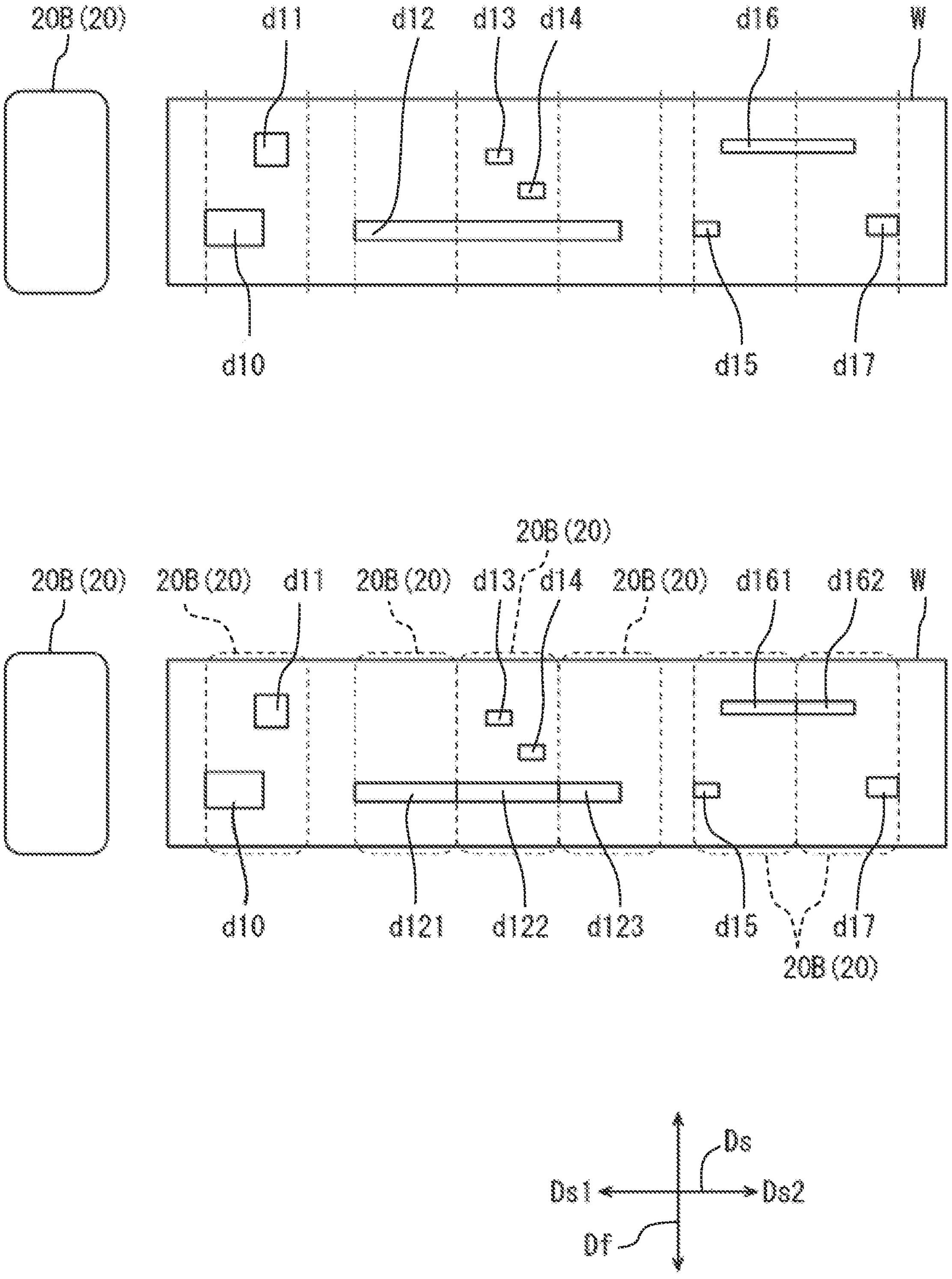

FIG. 15 explains stop positions of the discharge head when the printing is performed in a state in which the discharge head is stopped with respect to a plurality of recesses existing on the printing medium.

Figure 16:

FIG. 16 is illustrative of sectional views depicting a printing nozzle and a recess restoring nozzle.

The liquid droplet discharge apparatus, the liquid droplet discharge method, and the medium storing the liquid droplet discharge program according to embodiments of the present disclosure will be explained below with reference to the drawings. The liquid droplet discharge apparatus, the liquid droplet discharge method, and the medium storing the liquid droplet discharge program explained below are merely embodiments of the present disclosure. Therefore, the present disclosure is not limited to the embodiments described below. It is possible to make addition, deletion, and change within a range without deviating from the gist or essential characteristics of the present disclosure.

FIRST EMBODIMENT

Figure 1:
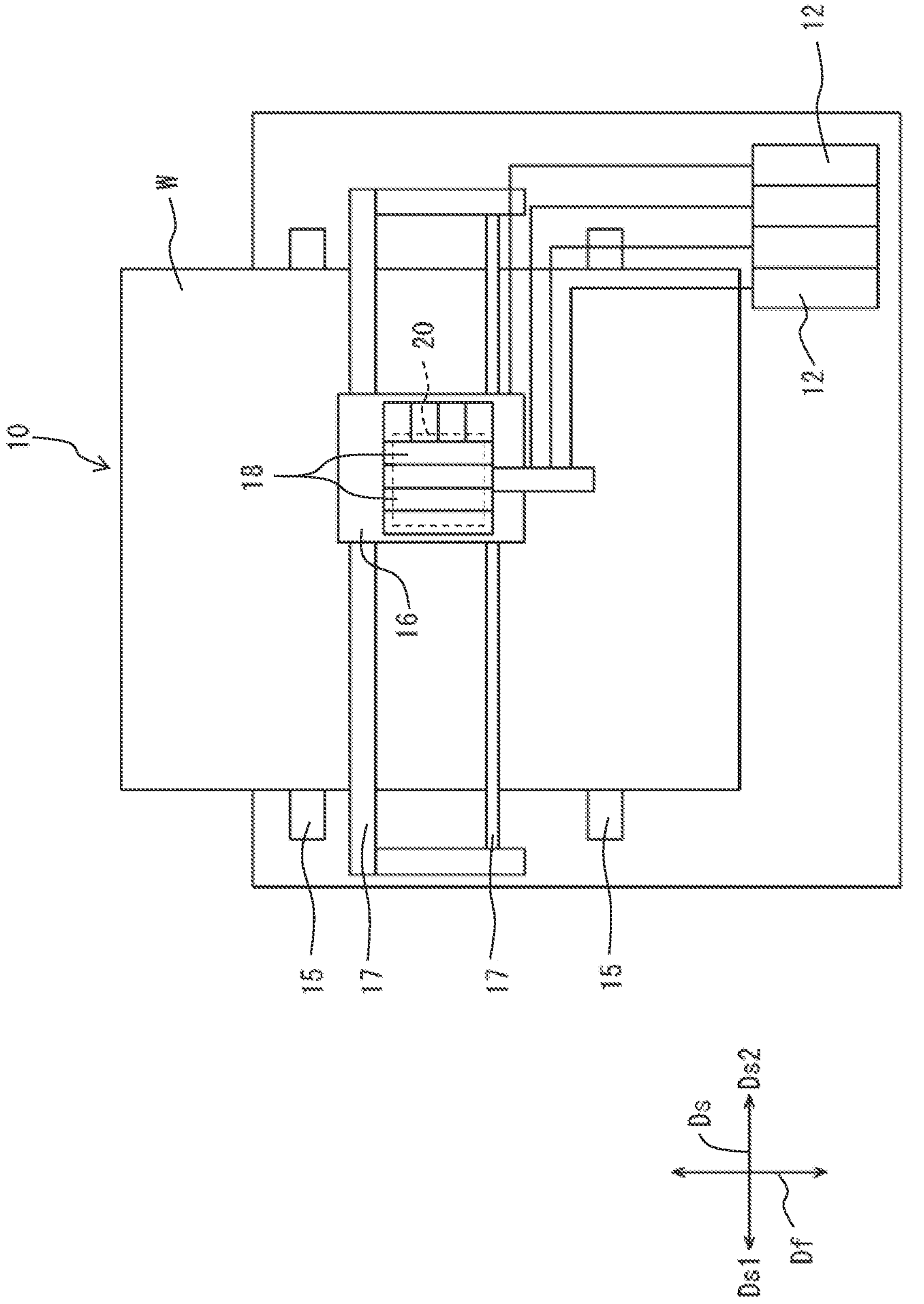
FIG. 1 is a plan view illustrative of schematic configuration of a liquid droplet discharge apparatus according to an embodiment of the present disclosure.

As depicted in FIG. 1, a liquid droplet discharge apparatus 10 of this embodiment is configured to use inks as examples of the liquid and discharge ink droplets as examples of the liquid droplets. The liquid droplet discharge apparatus 10 is provided with storage tanks 12, a carriage 16, a discharge head 20, a pair of conveying rollers 15, a pair of guide rails 17, and subtanks 18. Note that a printing medium W is arranged on an unillustrated platen of the liquid droplet discharge apparatus 10.

The discharge head 20 is carried on the carriage 16. The pair of guide rails 17 extend in the movement direction Ds orthogonal to the conveying direction Df of the printing medium W. The carriage 16 is supported by the pair of guide rails 17, and the carriage 16 is reciprocatively movable in the movement direction Ds along the guide rails 17. Accordingly, the discharge head 20 is reciprocatively movable in the movement direction Ds. A controller 71 can move the carriage 16 at one movement speed, among a plurality of movement speeds, while causing the discharge head 20 to discharge the ink droplets. Further, for example, the four subtanks 18 are carried on the carriage 16. The respective subtanks 18 are connected to the corresponding storage tanks 12 via tubes.

The pair of conveying rollers 15 are arranged in parallel to one another in the movement direction Ds. The conveying rollers 15 are rotated when an unillustrated conveyance motor is driven. Accordingly, the printing medium W, which is disposed on the platen, is conveyed in the conveying direction.

Inks are stored in the storage tanks 12. The storage tanks 12 are connected to the discharge head 20 via ink flow passages in order to supply the inks to the discharge head 20. Further, each of the storage tanks 12 is provided for every type of the ink. For example, the four storage tanks 12 are provided, in which the black, yellow, cyan, and magenta inks are stored respectively.

Figure 2:
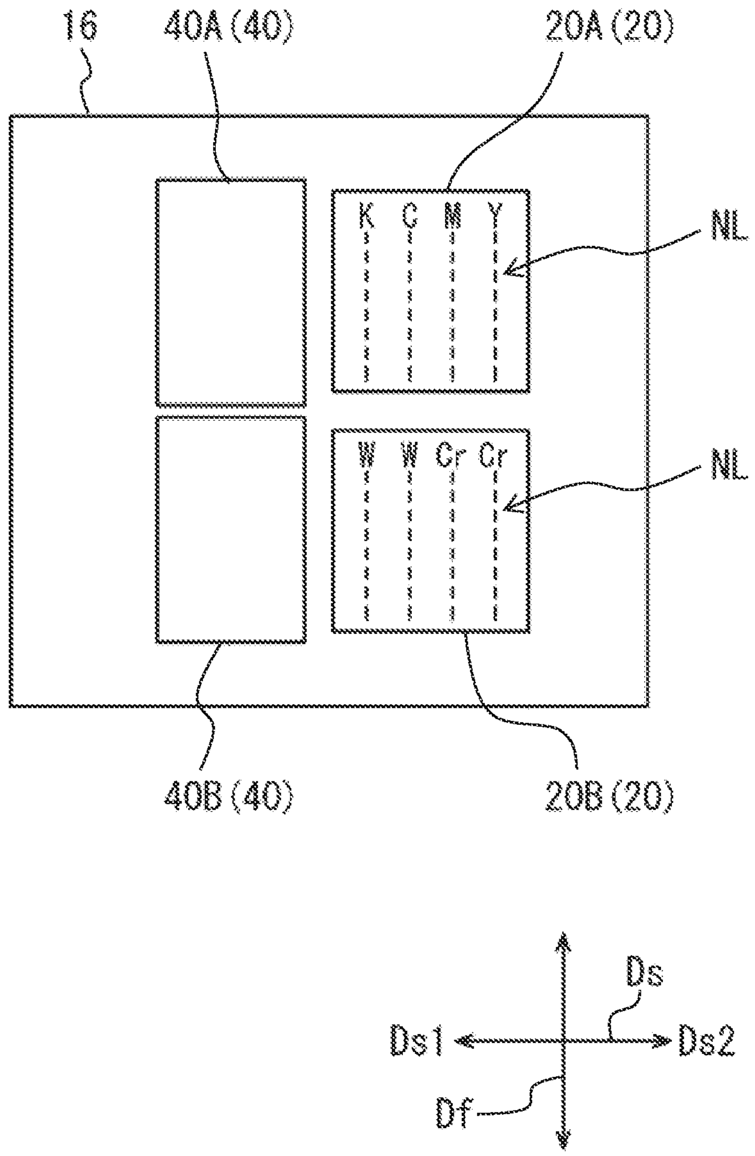
FIG. 2 is a plan view illustrative of an exemplary arrangement of a discharge head and a light source unit carried on a carriage depicted in FIG. 1.

As depicted in FIG. 2, the two discharge heads 20 (20A, 20B) and the two light source units 40 (40A, 40B) are carried on the carriage 16. The carriage 16 is configured to be reciprocatively movable in the movement direction Ds. Accordingly, the carriage 16 moves the discharge heads 20 and the light source units 40 in the movement direction Ds.

For example, an ink-jet head, which discharges ultraviolet-curable type ink droplets, can be used as the discharge head 20. The light source unit 40 emits the ultraviolet ray to be radiated onto the discharged ink droplets. The ink droplets are cured by being irradiated with the ultraviolet ray. The discharge head 20A and the discharge head 20B are arranged while being aligned in the conveying direction Df. The discharge head 20B is arranged, for example, in front of the discharge head 20A. Further, the light source unit 40A and the light source unit 40B are arranged while being aligned in the conveying direction Df. The light source unit 40B is arranged, for example, in front of the light source unit 40A. Further, the discharge head 20A and the light source unit 40A are arranged while being aligned in the movement direction Ds. The light source unit 40A is arranged at the left of the discharge head 20A (in one direction Ds1 of the movement direction Ds). Further, the discharge head 20B and the light source unit 40B are arranged while being aligned in the movement direction Ds. The light source unit 40B is arranged at the left of the discharge head 20B (in one direction Ds1 of the movement direction Ds). Note that the arrangement described above is referred to by way of example, and the present disclosure is not limited thereto.

The carriage 16 is moved to the right in the movement direction Ds (in the other direction Ds2 in the movement direction Ds) upon the first scanning in the printing process. Accordingly, the discharge heads 20 and the light source units 40 are moved rightwardly during the printing process. In this case, the discharge heads 20 discharge the ink droplets to the printing medium W while being moved rightwardly in the movement direction Ds, and the light source units 40 radiate the ultraviolet ray onto the ink droplets landed on the printing medium W while being moved rightwardly in the movement direction Ds. In this way, the light source units 40 are positioned at the back of the discharge heads 20 in the movement direction of the carriage 16 during the printing process. Therefore, the ultraviolet ray can be radiated onto the ink droplets immediately after the landing on the printing medium W.

The discharge head 20A discharges the ink droplets of respective colors of yellow (Y), magenta (M), cyan (C), and black (K) named generically as "color inks" in some cases. The discharge head 20A has nozzle arrays NL which discharge the respective ink droplets described above and which extend in the conveying direction Df respectively. The respective nozzle arrays NL are arranged at constant intervals in the movement direction Ds respectively. The arrangement order of the respective nozzle arrays NL in the movement direction Ds may be an order of the nozzle array NL which discharges the ink droplets of the black color, the nozzle array NL which discharges the ink droplets of the cyan color, the nozzle array NL which discharges the ink droplets of the magenta color, and the nozzle array NL which discharges the ink droplets of the yellow color, as referred to from the nozzle array NL disposed on the side in one direction Ds1 of the movement direction Ds.

On the other hand, the discharge head 20B discharges the ink droplets of the white (W) ink and the clear (Cr) ink. The discharge head 20B is provided with nozzle arrays NL which discharge the respective ink droplets described above and which extend in the conveying direction Df respectively. In particular, the discharge head 20B is provided with the two nozzle arrays NL which discharge the ink droplets of the white color and the two nozzle arrays NL which discharge the ink droplets of the clear color, as referred to from the nozzle array NL disposed on the side in one direction Ds1 of the movement direction Ds. The respective nozzle arrays NL are provided at constant intervals in the movement direction Ds.

A color image is printed on the printing medium W by discharging the ink droplets of the six colors described above to the printing medium W. In general, when the color image is printed, for example, on cloth or fabric as the printing medium W, the following procedure is adopted in order to reduce the influence on the color of the cloth or fabric or the material quality of the cloth or fabric. That is, the white ink droplets are discharged antecedently as the underlying base ink, and the ink droplets of the color inks are discharged onto the ink droplets of the white ink landed on the printing medium W. In particular, when the recess, which is present on the printing medium W, is restored by being filled up with the ink droplets, the discharge head 20B, which discharges the white ink or the clear ink, is used. In relation thereto, if the reproducibility of the color of the printing is improved when the recess is filled up, the white ink can be used. If the printing is performed while making good use of the color of the base material, the clear ink can be used.

Figure 3:
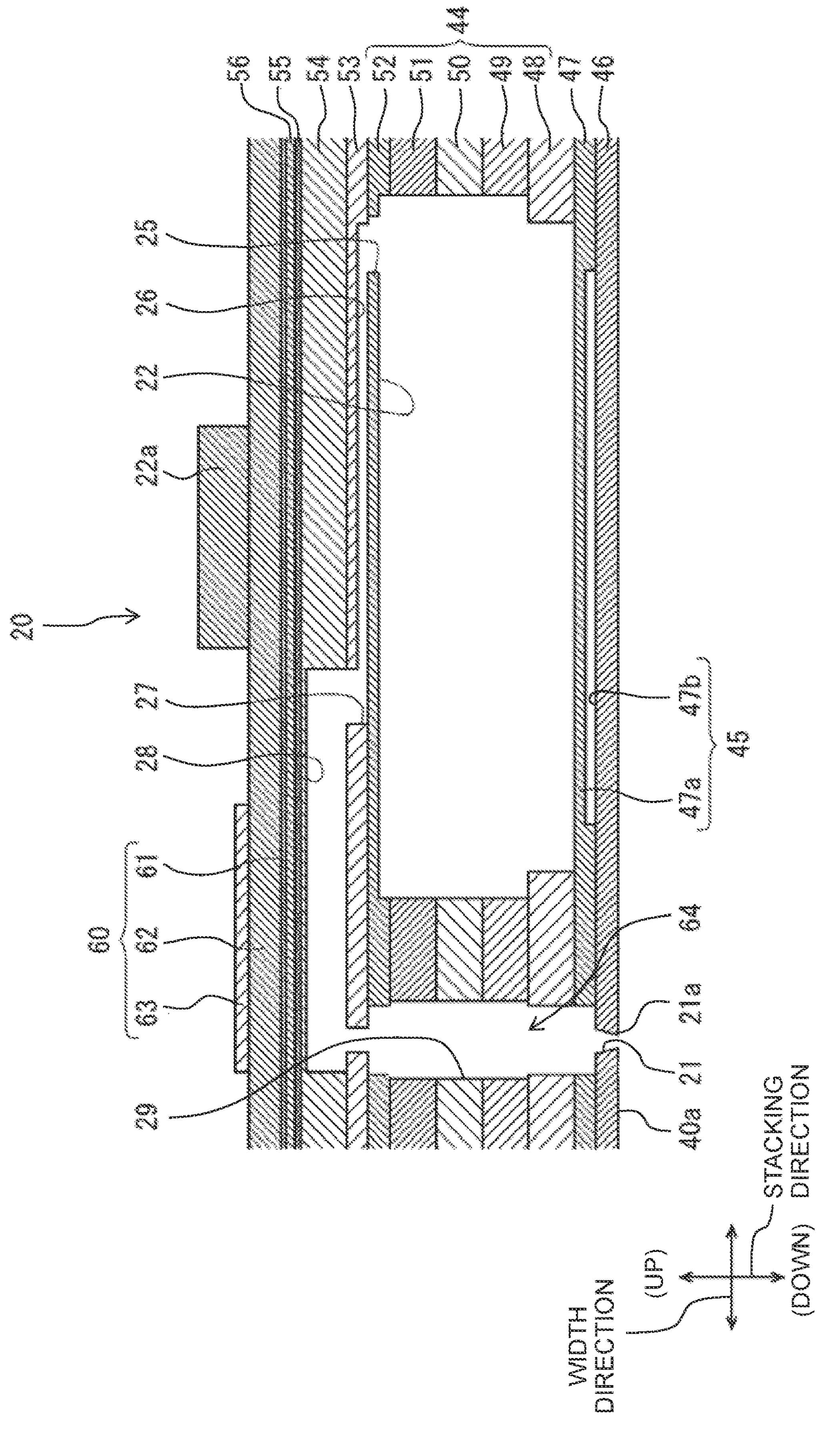
FIG. 3 is a sectional view of the discharge head of the liquid droplet discharge apparatus depicted in FIG. 1.

The discharge head 20 has a plurality of nozzles 21 (see FIG. 3) which discharge the ink droplets. As depicted in FIG. 3, the discharge head 20 is a stack of a flow passage forming member and a volume changing unit. Liquid flow passages are formed at the inside of the flow passage forming member. A plurality of nozzle holes 21*a* are open on a nozzle surface 40*a* which is a lower surface of the flow passage forming member. The volume of the liquid flow passage is changed by driving the volume changing unit described above. In this situation, the meniscus is vibrated in the nozzle hole 21*a*, and the ink is discharged.

The foregoing flow passage forming member of the discharge head 20 is a stack of a plurality of plates. The volume changing unit includes a vibration plate 55 and an actuator (piezoelectric element) 60. An insulating film 56 is formed on the vibration plate 55. A common electrode 61 described later on is formed on the insulating film 56.

The flow passage forming member is formed by stacking a nozzle plate 46, a spacer plate 47, a first flow passage plate 48, a second flow passage plate 49, a third flow passage plate 50, a fourth flow passage plate 51, a fifth flow passage plate 52, a sixth flow passage plate 53, and a seventh flow passage plate 54 as referred to in this order starting from the bottom. The first flow passage plate 48, the second flow passage plate 49, the third flow passage plate 50, the fourth flow passage plate 51, and the fifth flow passage plate 52 described above constitute a manifold plate 44.

Various large and small holes and grooves are formed for the respective plates. The holes and the grooves are combined at the inside of the flow passage forming member obtained by stacking the respective plates, and thus the plurality of nozzles 21, a plurality of individual flow passages 64, and a manifold 22 are formed as liquid flow passages.

The nozzle 21 is formed so that the nozzle 21 penetrates through the nozzle plate 46 in the stacking direction. A plurality of nozzle holes 21*a*, which are forward ends of the nozzles 21, are aligned in the conveying direction Df as the arrangement direction on the nozzle surface 40*a* of the nozzle plate 46, and thus the nozzle arrays NL is formed.

The manifold 22 supplies the ink to pressure chambers 23 described later on to which the discharge pressure for the ink droplets is applied. The manifold 22 extends in the arrangement direction. The manifold 22 is connected to one end of each of the of individual flow passages 64. That is, the manifold 22 functions as the common flow passage for the ink. The manifold 22 is formed by overlapping, in the stacking direction, the through-holes which penetrate through the first flow passage plate 48 to the fourth flow passage plate 51 in the stacking direction and the depression which is depressed from the lower surface of the fifth flow passage plate 52.

The nozzle plate 46 is arranged under or below the spacer plate 47. The spacer plate 47 is formed of, for example, a stainless steel material. The spacer plate 47 is formed with a recess 45 which is recessed in the thickness direction of the spacer plate 47 from the surface disposed on the side of the nozzle plate 46 by means of, for example, the half etching. The recess 45 has a damper space 47*b* and a thin-walled portion for forming a damper portion 47*a*. Owing to the configuration as described above, the damper space 47*b*, which serves as a buffer space, is formed between the manifold 22 and the nozzle plate 46.

A supply port 22*a* is communicated with the manifold 22. The supply port 22*a* is formed to have, for example, a cylindrical form. The supply port 22*a* is provided at one end in the arrangement direction described above. Note that the manifold 22 and the supply port 22*a* are connected to one another by an unillustrated flow passage which is provided to penetrate through an upper portion of the fifth flow passage plate 52, the sixth flow passage plate 53, and the seventh flow passage plate 54 respectively.

The plurality of individual flow passages 64 are connected to the manifold 22 respectively. Each of the individual flow passages 64 has its upstream end which is connected to the manifold 22 and its downstream end which is connected to the proximal end of the nozzle 21. Each of the individual flow passages 64 is composed of a first communication hole 25, a supply throttle passage 26 as an individual throttle passage, a second communication hole 27, a pressure chamber 28, and a descender 29. These constitutive components are connected to one another in this order. The pressure chamber 28 is communicated with the nozzle 21.

The first communication hole 25 has its lower end which is connected to the upper end of the manifold 22. The first communication hole 25 extends upwardly in the stacking direction from the manifold 22. The first communication hole 25 penetrates in the stacking direction through the upper portion of the fifth flow passage plate 52.

The upstream end of the supply throttle passage 26 is connected to the upper end of the first communication hole 25. The supply throttle passage 26 is configured by a groove which is formed, for example, by means of the half etching and which is depressed from the lower surface of the sixth flow passage plate 53. Further, the second communication hole 27 has its upstream end which is connected to the downstream end of the supply throttle passage 26. The second communication hole 27 extends upwardly in the stacking direction from the supply throttle passage 26. The second communication hole 27 is formed to penetrate in the stacking direction through the sixth flow passage plate 53.

The pressure chamber 28 has its upstream end which is connected to the downstream end of the second communication hole 27. The pressure chamber 28 is formed to penetrate in the stacking direction through the seventh flow passage plate 54.

The descender 29 is formed to penetrate in the stacking direction through the spacer plate 47, the first flow passage plate 48, the second flow passage plate 49, the third flow passage plate 50, the fourth flow passage plate 51, the fifth flow passage plate 52, and the sixth flow passage plate 53. The descender 29 is arranged on one side (left side in FIG. 3) in the widthwise direction orthogonal to the arrangement direction with respect to the manifold 22. The descender 29 has its upstream end which is connected to the downstream end of the pressure chamber 28, and the descender 29 has its downstream end which is connected to the proximal end of the nozzle 21. The nozzle 21 is overlapped with the descender 29, for example, in the stacking direction. The nozzle 21 is arranged at the center of the descender 29 in the widthwise direction orthogonal to the stacking direction.

The vibration plate 55 is stacked on the seventh flow passage plate 54. The vibration plate 55 covers an upper end opening of the pressure chamber 28.

The actuator 60 includes the common electrode 61, a piezoelectric layer 62, and an individual electrode 63. These components are arranged in this order as referred to from the bottom. The common electrode 61 covers the entire surface of the vibration plate 55 with the insulating film 56 intervening therebetween. The piezoelectric layer 62 is provided for each of the pressure chambers 28. The piezoelectric layer 62 is arranged on the common electrode 61 so that the piezoelectric layer 62 is overlapped with the pressure chamber 28. The individual electrode 63 is provided for each of the pressure chambers 28. The individual electrode 63 is arranged on the piezoelectric layer 62. One actuator 60 is composed of one individual electrode 63, the common electrode 61, and the portion of the piezoelectric layer 62 interposed by the both electrodes.

The individual electrode 63 is electrically connected to driver IC. The driver IC receives the control signal from the controller 71 described later on to generate the driving signal which is applied to the individual electrode 63. On the contrary, the common electrode 61 is always retained at the ground electric potential. In the configuration as described above, the active portion of the piezoelectric layer 62 is expanded/shrunk in the in-plane direction together with the two electrodes 61, 63 in response to the driving signal. In accordance therewith, the vibration plate 55 deforms the volume of the pressure chamber 28 in the direction to increase/decrease the volume. Accordingly, the discharge pressure, which discharges the ink droplets from the nozzle 21, is applied to the ink contained in the pressure chamber 28.

As for the discharge head 20, the supply port 22*a* is connected to the subtank 18 via the piping. When a pressurizing pump, which is provided for the piping, is driven, then the ink passes from the subtank 18 through the piping, and the ink flows into the manifold 22 via the supply port 22*a*. Then, the ink flows into the supply throttle passage 26 via the first communication hole 25 from the manifold 22, and the ink flows into the pressure chamber 28 via the second communication hole 27 from the supply throttle passage 26. Then, the ink flows through the descender 29, and the ink flows into the nozzle 21. In this situation, when the discharge pressure is applied to the pressure chamber 28 by the actuator 60, the ink droplets are discharged from the nozzle hole 21*a*.

Subsequently, an explanation will be made with reference to the drawings about other constitutive components or elements of the liquid droplet discharge apparatus 10 and an image recording apparatus 1 provided with the liquid droplet discharge apparatus 10. Note that the image recording apparatus 1 of this embodiment is, for example, an ink-jet printer.

Figure 4:
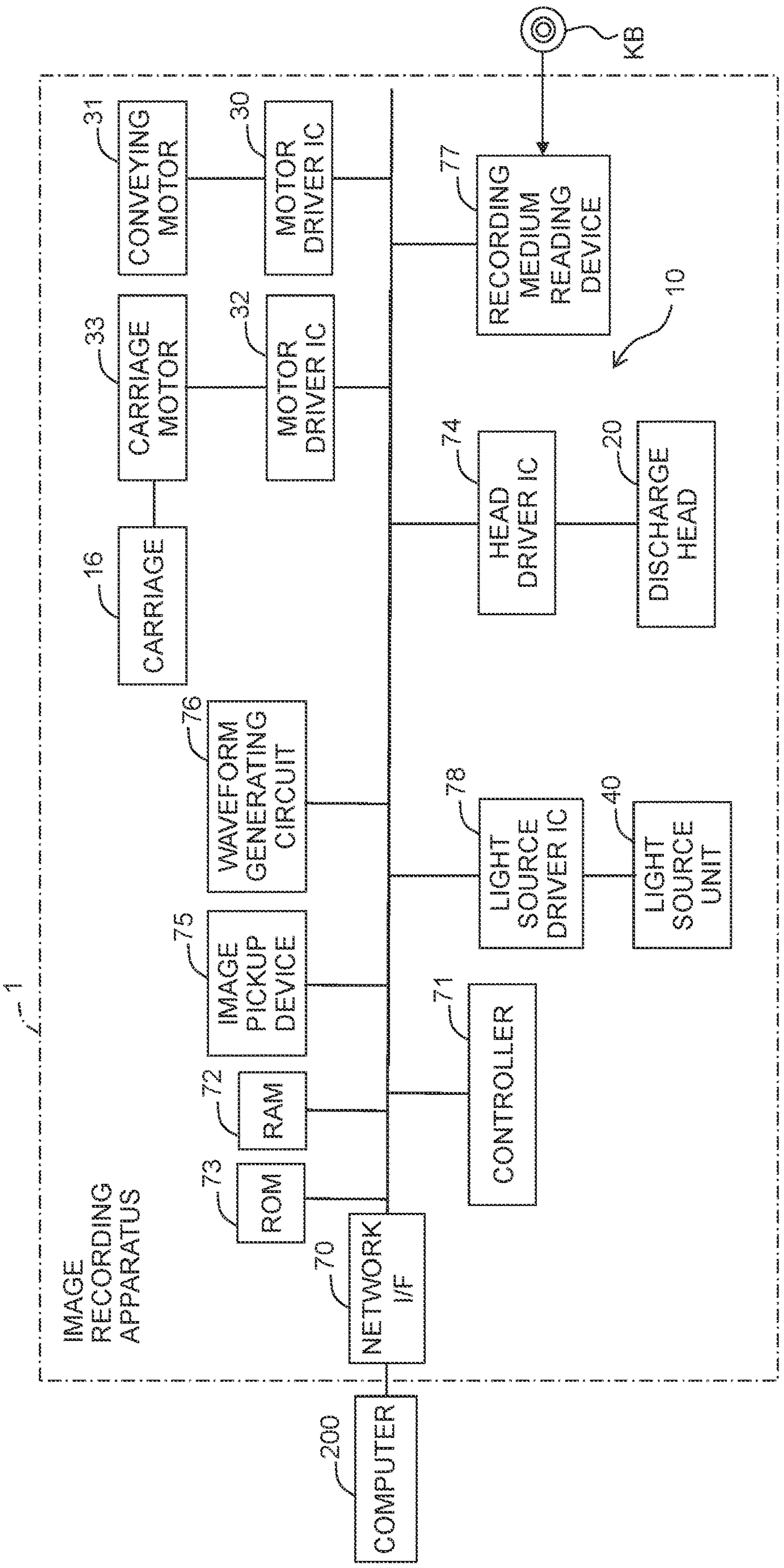
FIG. 4 is a block diagram illustrative of configuration of an image recording apparatus provided with the liquid droplet discharge apparatus depicted in FIG. 1.

As depicted in FIG. 4, other than the constitutive components described above, the liquid droplet discharge apparatus 10 is provided with, for example, the controller 71 which is composed of CPU or the like, RAM 72, ROM 73, a head driver IC 74, an image pickup device 75, a waveform generating circuit 76, a light source driver IC 78, motor driver ICs 30, 32, a conveyance motor 31, and a carriage motor 33. Further, the image recording apparatus 1 is provided with, for example, the liquid droplet discharge apparatus 10, a network interface (I/F) 70, and a recording medium reading device 77. Note that in this embodiment, the controller 71 corresponds to a computer, and the image pickup device 75 corresponds to the surface information acquiring device.

The image pickup device 75 acquires (picks up or photographs) an image of the surface of the printing medium W. The image pickup device 75 is, for example, a 3D scanner, and the image pickup device 75 is provided on the carriage 16. The controller 71 receives an image pickup result obtained by the image pickup device 75. The controller 71 calculates the area (square measure) and the volume of the recess existing on the printing medium W based on the image pickup result obtained by the image pickup device 75. In this embodiment, the recess is any one of a scratch, a depression, and both of the scratch and the depression.

The waveform generating circuit 76 generates the driving waveform of the driving signal for driving the actuator 60. The driving signal includes a discharge driving signal, a non-discharge driving signal, and a non-vibration signal. The discharge driving signal is the signal which is provided in order to apply the pressure to the ink contained in the pressure chamber 28 so that the ink droplets are discharged from the nozzle 21. The non-discharge driving signal is the signal which is provided in order to apply the pressure to the ink contained in the pressure chamber 28 so that the meniscus of the nozzle 21 is vibrated without discharging the ink droplets from the nozzle 21. The non-vibration signal is the signal which does not vibrate the meniscus of the nozzle 21. Further, the driving waveform described above includes a printing waveform which is used when the printing is performed on the printing medium W and a restoration waveform which is the waveform different from the printing waveform and which is used for filling up the recess. Note that the printing waveform and the restoration waveform will be described in detail later on.

The controller 71 executes a process in which the volume of the recess on the printing medium W is calculated based on the image pickup result obtained by the image pickup device 75, and a restoration waveform generating process in which the restoration waveform in accordance with the volume of the recess is generated by the waveform generating circuit 76. Further, the controller 71 executes a recess restoring process in which the actuator 60 is driven in accordance with the restoration waveform generated by the waveform generating circuit 76 so that the ink droplets are discharged from the nozzle 21 to the recess. Note that the controller 71 corresponds to the calculating means, the restoration waveform generation instructing means, and the recess restoration instructing means.

RAM 72 temporarily stores, for example, the printing job received via the network interface 70 from the computer 200 such as an external personal computer or the like. Further, RAM 72 temporarily stores, for example, the discharge data. ROM 73 stores, for example, the liquid droplet discharge program of this embodiment and the control program in order to perform various data processings.

The head driver IC 74 receives the command or instruction from the controller 71 so that the ink droplets are discharged from the discharge head 20. The light source driver IC 78 receives the command or instruction from the controller 71 so that the light source unit 40 radiates the ultraviolet ray. Further, the motor driver IC 30 receives the command or instruction from the controller 71 so that the driving of the conveyance motor 31 is controlled. The conveyance motor 31 conveys the printing medium W in the conveying direction Df as the conveying direction by operating the conveying roller 15. Further, the motor driver IC 32 receives the command or instruction from the controller 71 so that the driving of the carriage motor 33 is controlled. The carriage motor 33 moves the discharge head 20 in the movement direction Ds by operating the carriage 16.

The recording medium reading device 77 is a device which reads the liquid droplet discharge program from the computer-readable recording medium KB including, for example, flexible disk, CD (CD-ROM, CD-R, CD-RW and the like), DVD (DVD-ROM, DVD-RAM, DVD-R, DVD+R, DVD-RW, DVD+RW and the like), blu-ray disk, magnetic disk, optical disk, and magneto-optical disk. The recording medium reading device 77 may be a device which reads the liquid droplet discharge program from the recording medium including, for example, USB flash memory. The read liquid droplet discharge program is stored in ROM 73, and the program is executed by the controller 71. Note that the liquid droplet discharge program of this embodiment may be stored in ROM 73 via the network interface 70 from the external computer 200, or the liquid droplet discharge program of this embodiment may be downloaded from the internet and stored in ROM 73.

Figure 5:
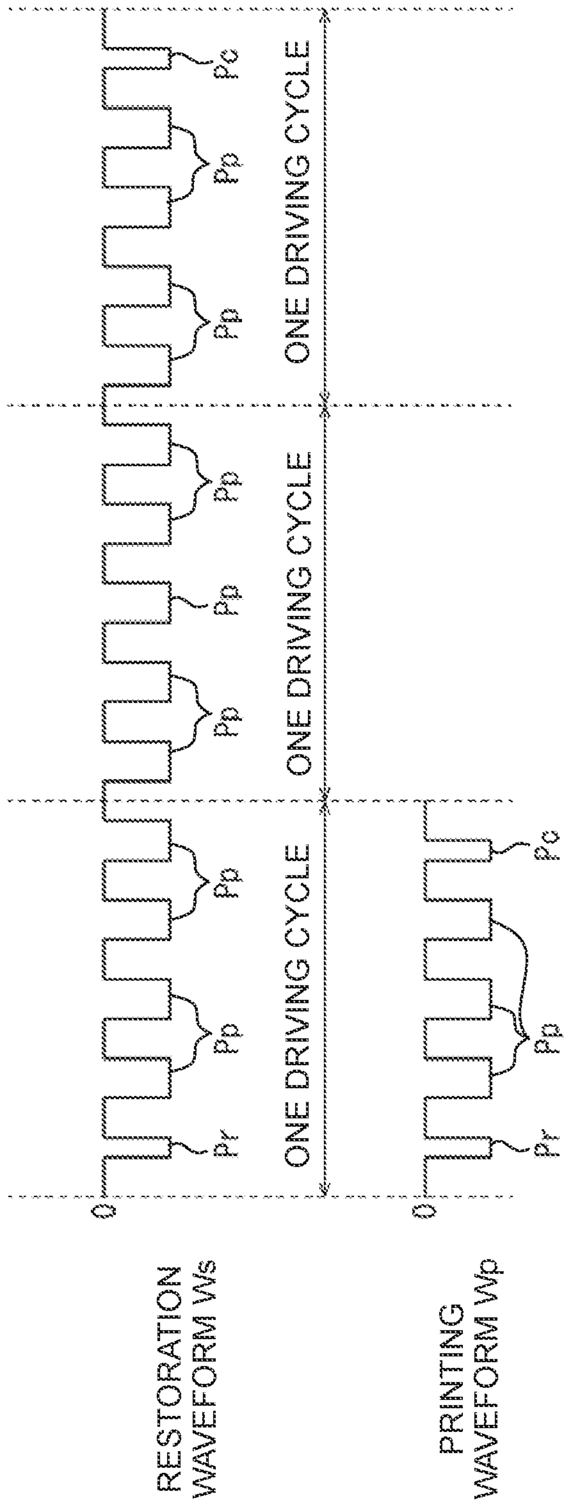
FIG. 5 is an explanatory drawing illustrative of a restoration waveform and a printing waveform generated by a waveform generating circuit.

As depicted in FIG. 5, the printing waveform Wp is the driving waveform as follows. That is, the printing waveform Wp has more discharge pulses Pp in one driving cycle, as the volume of the ink droplet to be discharged is larger. The printing waveform Wp depicted in FIG. 5 by way of example is the driving waveform which is provided in order to discharge the ink droplets composed of large droplets. In the driving waveform for discharging the ink droplets composed of middle droplets and the driving waveform for discharging the ink droplets composed of small droplets, the number of discharge pulses Ps included in one driving cycle is smaller than that of the printing waveform Wp described above. On the other hand, the restoration waveform Ws is the driving waveform which has, in one driving cycle, discharge pulses Pp of a number larger than the number of the discharge pulses Pp of any printing waveform Wp. In FIG. 5, the number of discharge pulses Pp of the printing waveform Wp is three, while the number of discharge pulses Pp of the restoration waveform Ws is four or five.

The printing waveform Wp is the driving waveform including, in one driving cycle, the pre-pulse Pr, the cancel pulse Pc, or both of the pre-pulse Pr and the cancel pulse Pc. The pre-pulse Pr is the pulse which is positioned at the beginning of one driving cycle and which is provided in order to improve the discharge performance by shaking the meniscus. The cancel pulse Pc is the pulse which is positioned at the end of one driving cycle and which is provided in order to suppress the remaining vibration that affects the driving waveform in the next driving cycle. With reference to FIG. 5, the printing waveform Wp has the pre-pulse Pr and the cancel pulse Pc in one driving cycle. On the other hand, the restoration waveform Wp is the waveform which includes at least one driving cycle, that includes none of the pre-pulse Pr and the cancel pulse Pc. In FIG. 5, one driving cycle, which does not include any one of the pre-pulse Pr and the cancel pulse Pc, is depicted.

In this embodiment, when the recess restoration is executed to fill up the recess existing on the printing medium W, the controller 71 decides whether the ink droplets are discharged from the discharge head 20B while moving the carriage 16 or the ink droplets are discharged from the discharge head 20B while stopping the carriage 16, depending on the recess in view of the realization of the short period of time of the process. The time, which is required to complete the recess restoring process by causing the discharge head 20B to discharge the ink droplets while moving the carriage 16 in the movement direction Ds, is referred to as "moving discharge time Th1". On the other hand, the time, which is required to complete the recess restoring process by causing the discharge head 20B to discharge the ink droplets in a state in which the carriage 16 stops, is referred to as "stop discharge time Th2". An explanation will be made in detail below about a method for calculating the moving discharge time Th1 and the stop discharge time Th2 calculated by the controller 71.

In this embodiment, assuming that the resolution is represented by K (dpi), 1 dot corresponds to the area of $(25.4/k)^2$ [$mm^2$]. Then, assuming that the area of the portion to be filled up in 1 pass is S [$mm^2$], the portion to be filled up can be filled up with the dots of $S\times(K/25.4)^2$.

In the next place, assuming that the required time, which is required when the nozzle array NL of the discharge head 20B passes over the recess in the movement direction Ds, is T, the discharge amount per unit time is $S\times(K/25.4)^2/T$ [dot/sec]. Then, assuming that the number of ink droplets (number of dots), which is required when the recess is filled up, is X, the time required for the recess restoration, i.e., the moving discharge time Th1 can be calculated in accordance with $X/(S\times(K/25.4)^2/T)$ [sec]. In this case, the controller 71 uses the minimum value of the plurality of movement speeds of the carriage 16 when the moving discharge time Th1 is calculated.

In the next place, the method for calculating the stop discharge time Th2 is as follows. It is assumed that the discharge frequency of the discharge head 20B is F [KHz], and the number of nozzles to be used for the recess restoration is W [pieces]. On this assumption, the discharge amount per unit time is $1000\times W\times F$ [dot/sec]. Then, assuming that the number of times of stop of the discharge head 20B is N, the discharge amount per unit time upon one time of stop is $1000\times W\times F/N$ [dot/sec].

Then, assuming that the number of ink droplets required to fill up the recess is X in the same manner as the case in which the moving discharge time Th1 is calculated, the time required for the recess restoration, i.e., the stop discharge time Th2 can be calculated in accordance with $X/(1000\times W\times F/N)$ [sec].

The moving discharge time Th1 and the stop discharge time Th2 will be explained below with reference to a specified example. Note that in FIG. 6 to FIG. 8, FIG. 12 described later on, and FIG. 15 described later on, the dimension in the conveying direction Df of the printing medium W corresponds to the amount of 1 pass.

In relation to the discharge head 20B depicted in FIG. 6 to FIG. 8, the two nozzle arrays NL for discharging the ink droplets of the white color are designated as "nozzle arrays NLW1. NLW2", and the two nozzle arrays NL for discharging the ink droplets of the clear color are designated as "nozzle arrays NLC1, NLC2".

In the following explanation, the recesses d1, d2, d3 are filled up by using only the nozzle array NLW2 of one array. With reference to FIG. 6, it is assumed that the required time T1, which is required when the nozzle array NLW2 of the discharge head 20B passes over the recess d1 in the movement direction Ds, is 0.05 [sec]. The required time T1 is calculated by the controller 71 from the movement speed of the discharge head 20B (movement speed of the carriage 16) and the dimension in the movement direction Ds of the recess d1 based on the image pickup result obtained by the image pickup device 75. Note that the required times T2. T3 described later on are calculated in the same manner as described above.

In this case, assuming that the discharge frequency F is 10 [KHz], the time, which is required to shoot one dot, is 0.0001 [sec]. Further, as depicted in FIG. 6, the number of nozzles 21 of the nozzle array NLW2 capable of filling up the recess d1 is 9. According to the numerical values described above and the area $(25.4/K)^2$ [$mm^2$] per one dot described above, assuming that the dots are scarcely overlapped with each other, the area S of the recess d1 is calculated in accordance with $(0.05/0.0001)\times9\times(25.4/K)^2$. Therefore, the discharge amount per unit time brought about by the nozzle array NLW2 is 4500/0.05=90000 [dot/sec] in accordance with $(0.05/0.0001)\times9\times(25.4/K)^2\times(K/25.4)^2/T1$.

Assuming that the number of dots required to fill up the recess d1 is, for example, 6000 dots, the moving discharge time Th1 is 6000/90000 [sec].

On the other hand, as described above, the stop discharge time Th2 can be calculated in accordance with X/(1000×W×F/N) [sec]. In this case, the stop discharge time Th2 is 6000/(1000×9×10/1)=6000/90000 [sec].

According to the above, in the exemplary case depicted in FIG. 6, the moving discharge time Th1 and the stop discharge time Th2 have the same value. In this case, taking account of the minute time loss caused by the acceleration/deceleration brought about when the carriage 16 is stopped, the controller 71 prepares a profile in order to perform the discharge while moving the discharge head 20B in the recess restoring process. As described above, when the recess d1 is filled up, the discharge is performed while moving the discharge head 20B.

Next, an explanation will be made with reference to FIG. 7 about a case in which the recess d2 is filled up. The shape of the recess d2 is different from the shape of the recess d1. A method for calculating the moving discharge time Th1 and the stop discharge time Th2 in the process to fill up the recess d2 is basically the same as that used when the recess d1 is filled up.

With reference to FIG. 7, it is assumed that the required time T2, which is required when the nozzle array NLW2 of the discharge head 20B passes over the recess d2, is 0.13 [sec]. Further, as depicted in FIG. 7, the number of nozzles 21 of the nozzle array NLW2 capable of filling up the recess d2 is 5. According to the numerical values described above and the area $(25.4/K)^2$[$mm^2$] of one dot described above, assuming that the shot dots are scarcely overlapped with each other, the area S of the recess d2 is calculated in accordance with $(0.13/0.0001)\times5\times(25.4/K)^2$. Therefore, the discharge amount per unit time brought about by the nozzle array NLW2 is 6500/0.13=50000 [dot/sec] in accordance with $(0.13/0.0001)\times5\times(25.4/K)^2\times(K/25.4)^2/T2$.

In the next place, assuming that the number of dots required to fill up the recess d2 is, for example, 10000 dots, the moving discharge time Th1 is 10000/50000. On the other hand, the stop discharge time Th2 is 10000/(1000×5×10/2)=20000/50000. Note that taking account of the fluidity of the ink droplets in relation to the recess d2, it is desirable that the carriage 16 is stopped once at every 0.07 [sec]. Therefore, it is assumed that the number of stops N is 2.

According to the above, in the exemplary case depicted in FIG. 7, the stop discharge time Th2 is longer than the moving discharge time Th1. Therefore, the controller 71 prepares a profile in order to perform the discharge while moving the discharge head 20B in the recess restoring process. As described above, when the recess d2 is filled up, the discharge is also performed while moving the discharge head 20B.

Next, an explanation will be made with reference to FIG. 8 about a case in which the recess d3 is filled up. The shape of the recess d3 is different from the shapes of the recesses d1, d2. A method for calculating the moving discharge time Th1 and the stop discharge time Th2 in the process to fill up the recess d3 is basically the same as those used when the recesses d1, d2 are filled up.

With reference to FIG. 8, it is assumed that the required time T3, which is required when the nozzle array NLW2 of the discharge head 20B passes over the recess d3, is 0.05 [sec]. Further, as depicted in FIG. 8, the number of nozzles 21 of the nozzle array NLW2 capable of filling up the recess d3 is 7. According to the numerical values described above and the area $(25.4/K)^2$[$mm^2$] of one dot described above, assuming that the dots are scarcely overlapped with each other, the area S of the recess d3 is calculated in accordance with $(0.05/0.0001)\times7\times(25.4/K)^2$. Therefore, the discharge amount per unit time brought about by the nozzle array NLW2 is 3500/0.05=70000 [dot/sec] in accordance with $(0.05/0.0001)\times7\times(25.4/K)^2\times(K/25.4)^2/T3$.

Assuming that the number of dots required to fill up the recess d3 is, for example, 7000 dots, the moving discharge time Th1 is 7000/70000. On the other hand, the stop discharge time Th2 is 7000/(1000×7×10/1)=7000/70000.

According to the above, in the exemplary case depicted in FIG. 8, the moving discharge time Th1 and the stop discharge time Th2 have the same value. In this case, taking account of the minute time loss caused by the acceleration/deceleration brought about when the carriage 16 is stopped, the controller 71 prepares a profile in order to perform the discharge while moving the discharge head 20B in the recess restoring process. As described above, when the recess d3 is filled up, the discharge is performed while moving the discharge head 20B in the same manner as when the recess d1 is filled up.

After the recesses d1, d2, d3 are restored in accordance with the profiles corresponding to the recesses d1, d2, d3, the printing is performed to discharge, onto the printing medium W, the ink droplets having the same white color as that of the ink droplets used for the restoration. Then, the ordinary printing of, for example, a pattern or design, a picture or the like can be performed by using the discharge head 20A, if necessary, on the printing medium W to which the ink droplets of the white color have been discharged. Note that it is desirable to perform the purge process for the discharge head 20A all at once immediately before the ordinary printing described above in view of the reduction of the number of times of the purge.

A series of processes to be performed by the controller 71 will be explained below with reference to flow charts depicted in FIG. 9 to FIG. 11.

As depicted in FIG. 9, the controller 71 causes the image pickup device 75 to pick up an image of the surface of the printing medium W (Step S1). Accordingly, the image pickup device 75 acquires, as the image pickup result, the information about the surface of the printing medium W.

Subsequently, the controller 71 calculates the depth and the volume of the recess on the printing medium W based on the image pickup result obtained by the image pickup device 75. The controller 71 determines whether or not the recess is present on the printing medium W based on the calculation result (Step S2). In this case, if the value of the depth or the value of the volume of the recess is not less than a threshold value, the controller 71 can determine that the recess is present on the printing medium W. If it is acknowledged that the recesses d1, d2, d3 are present on the printing medium W (YES in Step S2), the controller 71 causes RAM 72 to store the positions of the recesses d1, d2, d3 on the printing medium W (Step S3). On the other hand, if the recesses are not present on the printing medium W (NO in Step S2), the controller 71 terminates the process.

After the process of Step S3, the controller 71 estimates the ink amounts in the present situation in relation to the recesses d1, d2, d3 based on the image pickup result obtained by the image pickup device 75 (Step S4). Then, the controller 71 estimates the ink amounts required for the portions corresponding to the recesses d1, d2, d3 (i.e., the portions to be originally subjected to the printing in a state in which the recesses d1, d2, d3 are not present) based on the discharge data (Step S5).

Subsequently, the controller 71 acquires the ink amounts required for the recess restoration (Step S6) by subtracting the ink amounts estimated in Step S4 from the ink amounts estimated in Step S5. Then, the controller 71 prepares the restoration data in order to restore the recesses d1, d2, d3 (Step S7). After the processes as described above, the controller 71 executes the restoring printing (Step S8). The restoring printing will be explained below with reference to the flow charts.

As depicted in FIG. 10, the controller 71 acquires the number L of the recesses included in 1 pass (Step S11) based on the position information of the recesses in Step S3 described above. Subsequently, the controller 71 sets the Mth recess of the L pieces of recesses (Step S12) as the restoration target, and the controller 71 calculates the moving discharge time Th1 and the stop discharge time Th2 as described above for the set recess (Step S13). Accordingly, the moving discharge time Th1 and the stop discharge time Th2, which correspond to the recess on the printing medium W, are calculated respectively.

If the calculated moving discharge time Th1 is equal to or shorter than the stop discharge time Th2 (YES in Step S14), the controller 71 prepares the profile (moving restoration profile) in order to perform the discharge while moving the discharge head 20B (Step S15). On the other hand, if the moving discharge time Th1 is longer than the stop discharge time Th2 (NO in Step S14), the controller 71 prepares the profile (stop restoration profile) in order to perform the discharge in a state in which the discharge head 20B is stopped (Step S16).

After the process of Step S15 and the process of Step S16, the controller 71 determines whether or not the profiles are prepared for all of the L pieces of recesses (Step S17). If all of the profiles are prepared (YES in Step S17), the controller 71 causes the discharge head 20B to perform the printing in an amount corresponding to 1 pass (Step S18). On the other hand, if all of the profiles are not prepared (NO in Step S17), then the controller 71 provides M=M+1 (Step S19), and the controller 71 returns to the process of Step S12 described above to repeat the process of Step S12 and the processes to be performed thereafter.

After the process of Step S18, the controller 71 causes the image pickup device 75 to pick up an image of the restored portion. The controller 71 calculates the depth of the restored portion based on the image pickup result (Step S20). Subsequently, the controller 71 determines whether or not the calculated depth is less than a predetermined value (Step S21 depicted in FIG. 11). If the depth is not less than the predetermined value (NO in Step S21), the controller 71 causes the discharge head 20B to additionally perform the printing (Step S22) in order that the depth is less than the predetermined value. In this case, if the recess cannot be completely filled up by 1 pass, i.e., if the ink droplets in an amount corresponding to the amount of the volume of the recess cannot be discharged by 1 pass, then the recess restoration is performed by the additional pass. Accordingly, the restoration can be performed to provide a state in which the recess is filled up approximately completely. Note that the predetermined value is exemplified, for example, by 20 nm. However, there is no limitation thereto. Further, ROM 73 stores the profile (moving restoration profile) in order to discharge the ink droplets while moving the discharge head 20B in the additional pass. In the additional pass, the controller 71 causes the discharge head 20B to discharge therefrom the ink amount which makes it possible to fill up the amount of the depth corresponding to the predetermined value by using the moving restoration profile for the additional pass.

If the depth is less than the predetermined value (YES in Step S21) after the process of Step S22, the controller 71 determines whether or not the printing is completed for all of the passes (Step S23). If the printing is completed for all of the passes (YES in Step S23), the controller 71 terminates the process. On the other hand, if the printing is not completed for all of the passes (NO in Step S23), then the controller 71 conveys the printing medium W in the conveying direction Df by driving the conveying rollers 15 (Step S24), and then the controller 71 returns to the process of Step S11 described above to repeat the process of Step S11 and the processes to be performed thereafter.

SECOND EMBODIMENT

In the next place, an explanation will be made about the process performed by the controller 71 according to a second embodiment. The second embodiment is different from the first embodiment in that the process of S13 (process for calculating the moving discharge time Th1 and the stop discharge time Th2) depicted in FIG. 10 of the first embodiment is not performed. That is, the controller 71 decides whether the moving restoration profile is prepared or the stop restoration profile is prepared, based on the comparison between the ink amount required for the restoration and the ink amount capable of being discharged while moving the discharge head 20B. An explanation will be made below with reference to a specified example.

In this embodiment, an explanation will be made with reference to an exemplary case in which the nozzle arrays NLW1, NLW2 as the two nozzle arrays NL are used to fill up the recess d1 (FIG. 6 described above), the recess d2 (FIG. 7 described above), and the recess d3 (FIG. 8 described above). In the following explanation, reference will be appropriately made to FIG. 6 and FIG. 8 which have been used for the explanation of the first embodiment.

It is assumed that the ink amount, which is required for the restoration of the recess d1 as calculated in Step S6 depicted in FIG. 9 described above, is 6000 dots in this embodiment. In this case, as explained in the first embodiment, the discharge amount per unit time, which is provided by the nozzle array NLW2, is 4500/0.05=90000 [dot/sec]. Further, the required time T1 is 0.05 [sec] in the same manner as the first embodiment. On the foregoing assumption, when the two nozzle arrays NLW1, NLW2 are used in this embodiment, it is possible to shoot the ink droplets of 90000×0.05×2=9000 dots. Therefore, the ink amount, which can be shot by the nozzle arrays NLW1. NLW2 of the moving discharge head 20B, is larger than the ink amount required for the restoration. On this account, the controller 71 determines that the printing can be performed while moving the discharge head 20B, and the controller 71 prepares the moving restoration profile.

The next exemplary case will be explained. It is assumed that the ink amount, which is required for the restoration of the recess d2 as calculated in Step S6 depicted in FIG. 9 described above, is, for example, 15000 dots. As explained in the first embodiment, the discharge amount per unit time, which is provided by the nozzle array NLW2, is 6500/0.13=50000 [dot/sec]. Further, the required time T2 is 0.13 [sec] in the same manner as the first embodiment. On the foregoing assumption, when the two nozzle arrays NLW1, NLW2 are used in this embodiment, it is possible to shoot the ink droplets of 50000×0.13×2=13000 dots. Therefore, the ink amount, which can be shot by the nozzle arrays NLW1, NLW2 of the moving discharge head 20B, is smaller than the ink amount required for the restoration. On this account, the recess d2 cannot be restored completely by the printing to be performed while moving the discharge head 20B. Therefore, the controller 71 determines that the printing cannot be performed while moving the discharge head 20B, and the controller 71 prepares the stop restoration profile.

In this case, as depicted in FIG. 12, it is possible to perform the printing by stopping the discharge head 20B, for example, twice. The ink droplets are discharged in a state in which the nozzle arrays NLW1. NLW2 of the discharge head 20B are stopped at the positions disposed over or above the portion disposed on the Ds1 side of the recess d2 as depicted in the upper part of FIG. 12. After that, the ink droplets are discharged in a state in which the nozzle arrays NLW1, NLW2 are stopped at the positions disposed over or above the portion disposed on the Ds2 side of the recess d2. Note that, for example, 10000 dots, which are included in 15000 dots as the ink amount required for the restoration of the recess d2, can be shot upon the first stop, and remaining 5000 dots can be shot upon the second stop. Alternately, for example, 7500 dots, which are included in 15000 dots, may be shot upon the first stop, and remaining 7500 dots may be shot upon the second stop.

The next exemplary case will be explained. It is assumed that the ink amount, which is required for the restoration of the recess d3 as calculated in Step S6 depicted in FIG. 9 described above, is, for example, 7000 dots. As explained in the first embodiment, the discharge amount per unit time, which is provided by the nozzle array NLW2, is 3500/0.05=70000 [dot/sec]. Further, the required time T3 is 0.05 [sec] in the same manner as the first embodiment. On the foregoing assumption, when the two nozzle arrays NLW1, NLW2 are used in this embodiment, it is possible to shoot the ink droplets of 70000×0.05×2=7000 dots. Therefore, the ink amount, which can be shot by the nozzle arrays NLW1. NLW2 of the moving discharge head 20B, is equal to the ink amount required for the restoration. In this case, the controller 71 determines that the printing can be performed while moving the discharge head 20B, and the controller 71 prepares the moving restoration profile.

As depicted in FIG. 13, the controller 71 acquires the number L of the recesses included in 1 pass (Step S31) based on the position information of the recesses in Step S3 described above. Subsequently, the controller 71 sets the Mth recess of the L pieces of recesses (Step S32) as the restoration target.

Subsequently, the controller 71 determines whether or not the printing can be performed while moving the discharge head 20B (Step S33). In this case, the controller 71 determines based on the comparison between the ink amount required for the restoration as described above and the ink amount capable of being discharged while moving the discharge head 20B.

If the printing can be performed while moving the discharge head 20B (YES in Step S33), the controller 71 prepares the moving restoration profile (Step S34). On the other hand, if the printing cannot be performed while moving the discharge head 20B (NO in Step S33), the controller 71 prepares the stop restoration profile (Step S35).

After the process of Step S34 and the process of Step S35, the controller 71 determines whether or not the profiles are prepared for all of the L pieces of recesses (Step S36). If all of the profiles are prepared (YES in Step S36), the controller 71 causes the discharge head 20B to perform the printing in an amount corresponding to 1 pass (Step S37). On the other hand, if all of the profiles are not prepared (NO in Step S36), then the controller 71 provides M=M+1 (Step S38), and the controller 71 returns to the process of Step S32 described above to repeat the process of Step S32 and the processes to be performed thereafter.

After the process of Step S37, the controller 71 causes the image pickup device 75 to pick up an image of the restored portion. The controller 71 calculates the depth of the restored portion based on the image pickup result (Step S39). Then, the controller 71 determines whether or not the calculated depth is less than a predetermined value (Step S40 depicted in FIG. 14). If the depth is not less than the predetermined value (NO in Step S40), the controller 71 causes the discharge head 20B to additionally perform the printing (Step S41) in order that the depth is less than the predetermined value.

If the depth is less than the predetermined value (YES in Step S40) after the process of Step S41, the controller 71 determines whether or not the printing is completed for all of the passes (Step S42). If the printing is completed for all of the passes (YES in Step S42), the controller 71 terminates the process. On the other hand, if the printing is not completed for all of the passes (NO in Step S42), then the controller 71 conveys the printing medium W in the conveying direction Df by driving the conveying rollers 15 (Step S43), and then the controller 71 returns to the process of Step S31 described above to repeat the process of Step S31 and the processes to be performed thereafter.

THIRD EMBODIMENT

In the next place, an explanation will be made with reference to FIG. 15 about stop positions of the discharge head 20B when the printing is performed in a state in which the discharge head 20B is stopped with respect to a plurality of recesses existing on the printing medium W. An upper part of FIG. 15 depicts positions of recesses d10, d11, d12, d13, d14, d15, d16, d17. A lower part of FIG. 15 depicts the respective stop positions of the discharge head 20B as depicted by broken lines. In the explanation with reference to FIG. 15, all of the four nozzle arrays NL of the discharge head 20B discharge ink droplets of the white color. Then, in the following explanation in relation to FIG. 15, the four nozzle arrays NL are referred to as "first nozzle array NL", "second nozzle array NL", "third nozzle array NL", and "fourth nozzle array NL" starting from the side in one direction Ds1 of the movement direction Ds. Further, in order to understand more easily, the position of the first nozzle array NL is allowed to coincide with the left end of the discharge head 20B (end portion on the side in one direction Ds1), and the position of the fourth nozzle array NL is allowed to coincide with the right end of the discharge head 20B (end portion on the side in the other direction Ds2).

The controller 71 acquires the position of the recess on the printing medium W in the same manner as described above. In relation to FIG. 15, the controller 71 acquires the respective positions of the recesses d10, d11, d12, d13, d14, d15, d16, d17. In other words, the controller 71 causes RAM 72 to store the positions of the recesses d10, d11, d12, d13, d14, d15, d16, d17 on the printing medium W.

Then, the controller 71 starts the printing in such a state that the first nozzle array NL, which is included in the plurality of nozzle arrays NL of the discharge head 20B and which is the nozzle array disposed on one end side positioned at the endmost position in one direction Ds1 of the movement direction Ds, is positioned at the end portion in one direction Ds1 of the recess d10 which is positioned at the endmost position in one direction Ds1.

In this case, when the first nozzle array NL is positioned at the end portion on the side in one direction Ds1 as described above, such a recess exists in some cases that the recess extends while exceeding, in the other direction Ds2, the fourth nozzle array NL which is included in the four nozzle arrays NL and which is positioned at the endmost position in the other direction Ds2 of the movement direction Ds (i.e., the recess which is divided by the fourth nozzle array NL as viewed in a plan view). With reference to FIG. 15, the recess d12 and the recess d16 fall under the divided recess as described above. In such a situation, the controller 71 executes the next printing in such a state that the first nozzle array NL, which is the nozzle array disposed on one end side, is positioned at the division point of the recess d12 (recess d16). In other words, the printing is performed with respect to the recess d12 while dividing the recess d12 into three recesses d121, d122, d123. The printing is performed with respect to the recess d16 while dividing the recess d16 into two recesses d161, d162.

Note that a recess restoring nozzle 121 depicted in FIG. 16 is used when the recess restoring process is performed. In other words, the discharge head 20B has the recess restoring nozzles 121. The recess restoring nozzle 121 has the diameter of the nozzle hole 121*a* which is larger than that of the printing nozzle 21. When the recess restoring nozzle 121, which has the large diameter of the nozzle hole 121*a*, is used, it is thereby possible to increase the discharge amount per unit time. Therefore, it is possible to shorten the time required for the process.

As described above, according to the liquid droplet discharge apparatus 10 of the foregoing embodiment, the volume of the recess on the printing medium W is calculated by the controller 71 based on the image pickup result obtained by the image pickup device 75. Accordingly, it is possible to obtain the correct volume of the recess. Then, the controller 71 executes the recess restoring process in which the actuator 60 is driven in accordance with the driving waveform generated by the waveform generating circuit 76. In this way, the driving waveform, which corresponds to the volume of the recess on the printing medium W, is used. Therefore, it is possible to fill up the recess without any excess and any deficiency. On this account, it is possible to avoid any excessive discharge of the ink droplets with respect to the recess. Therefore, it is possible to fill up the recess in a short period of time as compared with the conventional technique.

Further, in the embodiment described above, the restoration waveform Ws, which has the large number of discharge pulses Pp in one driving cycle as compared with the printing waveform Wp, is used when the recess is restored. On this account, it is possible to shorten the time required to fill up the recess by using the ink droplets. Accordingly, it is possible to restore the recess in a short period of time.

Further, in the embodiment described above, the restoration waveform Ws includes at least one driving cycle which does not include any one of the pre-pulse Pr and the cancel pulse Pc. Accordingly, it is possible to arrange a large number of discharge pulses Pp in the driving cycle.

Further, in the embodiment described above, if the moving discharge time Th1 is not more than the stop discharge time Th2, the controller 71 prepares the moving restoration profile in order to discharge the ink droplets while moving the discharge head 20B. On the other hand, if the moving discharge time Th1 exceeds the stop discharge time Th2, the controller 71 prepares the stop restoration profile in order to discharge the ink droplets in the state in which the discharge head 20B is stopped. Accordingly, it is possible to select the printing in which the time required for the printing is short, from the printing which is performed while moving the discharge head 20B and the printing which is performed in the state in which the discharge head 20B is stopped.

Further, in the embodiment described above, the controller 71 uses the minimum value of the plurality of movement speeds of the carriage 16 when the moving discharge time Th1 is calculated. In this case, it is possible to use the maximum value as the required time T in $S\times(K/25.4)^2/T$ [dot/sec] described above as the formula for calculating the discharge amount per unit time. Accordingly, it is possible to compare the stop discharge time Th2 with the moving discharge time Th1 calculated while taking account of the minimum value of the discharge amount per unit time.

Further, in the embodiment described above, when the first nozzle array NL is positioned at the end portion on the side in one direction Ds1, such a recess exists in some cases that the recess extends while exceeding, in the other direction Ds2, the fourth nozzle array NL which is included in the four nozzle arrays NL and which is the nozzle array disposed on the other end side positioned at the endmost position in the other direction Ds2 of the movement direction Ds (i.e., the recess divided by the fourth nozzle array NL as viewed in a plan view). In such a situation, the controller 71 executes the next printing in a state in which the first nozzle array NL, which is the nozzle array disposed on one end side, is positioned at the division point of the recess d12 (recess d16). Accordingly, it is possible to restrict the number of stops of the discharge head 20B to the minimum.

Further, in the embodiment described above, the controller 71 calculates the depth of the restored portion. If the depth is not less than 20 nm as the predetermined value, the controller 71 causes the discharge head 20B to additionally perform the printing in order that the depth is less than 20 nm. Accordingly, it is possible to reliably fill up and restore the recess.

Further, in the embodiment described above, the recess restoring nozzle 121, which has the large diameter of the nozzle hole 121*a*, is used when the printing is performed. Thus, it is possible to increase the discharge amount per unit time. Accordingly, it is possible to shorten the processing time.

(Modifications)

The present disclosure is not limited to the embodiments described above. It is possible to make various modifications within a range without deviating from the gist or essential characteristics of the present disclosure. For example, the following modifications are available.

In the embodiment described above, the image pickup device 75 is adopted as an example of the surface information acquiring device. However, there is no limitation thereto. For example, a measuring device, which measures the regular reflection light or the diffused light coming from the printing medium W, may be also used as the surface information acquiring device.

Further, in the embodiment described above, the recess restoring nozzle 121 is used. However, it is not essential to use the recess restoring nozzle 121. It is also allowable to perform the printing by using the printing nozzle 21.

Further, in the embodiment described above, the voltage value of the discharge pulse Pp of the restoration waveform Ws is the constant value. However, there is no limitation thereto. The top and the bottom of the voltage value may be adjusted depending on the depth or the volume of the recess.

Further, in the embodiment described above, the controller 71 causes the discharge head 20B to discharge therefrom the ink amount which makes it possible to fill up the depth corresponding to the predetermined value when the controller 71 causes the discharge head 20B to additionally perform the printing in order that the depth of the recess is less than the predetermined value in Step S21. However, there is no limitation thereto. The controller 71 may estimate the ink amount in the present situation corresponding to Step S4 based on the image pickup result obtained by the image pickup device 75, and the controller 71 may estimate the ink amount required for the recess again based on the discharge data.

Further, in the embodiment described above, ROM 73 stores the profile (moving restoration profile) for the additional pass in order to perform the discharge while moving the discharge head 20B. Then, when the controller 71 causes the discharge head 20B to additionally perform the printing in order that the depth is less than the predetermined value in Step S21, the moving restoration profile for the additional pass is used. However, there is no limitation thereto. ROM 73 may store a profile (stop restoration profile) for the additional pass in order that the discharge is performed in a state in which the discharge head 20B is stopped. Then, the stop restoration profile for the additional pass may be used in the additional pass.

What is claimed is:

1. A liquid droplet discharge apparatus comprising:

a discharge head having a nozzle and an actuator, the nozzle being configured to discharge liquid droplets onto a printing medium, the actuator being configured to apply pressure to liquid contained in a pressure chamber communicated with the nozzle;

a waveform generating circuit configured to generate driving waveforms of signals for driving the actuator;

a surface information acquiring device configured to acquire information about a surface of the printing medium; and a controller, wherein the controller is configured to:

calculate a volume of a recess on the printing medium based on first information about the surface of the printing medium acquired by the surface information acquiring device;

cause the waveform generating circuit to generate a driving waveform for filling up the recess in accordance with the volume of the recess;

perform restoration of the recess by driving the actuator in accordance with the driving waveform generated by the waveform generating circuit such that the liquid droplets are discharged from the nozzle to the recess; and cause the discharge head to participate in printing an image on the printing medium.

2. The liquid droplet discharge apparatus according to claim 1, wherein:

the driving waveforms include printing waveforms and a restoration waveform, the printing waveforms being used when printing is performed on the printing medium, the restoration waveform being a waveform different from the printing waveform and being used for filling up the recess; and the controller is configured to cause the waveform generating circuit to generate the restoration waveform in accordance with the volume of the recess.

3. The liquid droplet discharge apparatus according to claim 2, wherein:

the printing waveforms have more discharge pulses in one driving cycle as a volume of the liquid droplet to be discharged becomes larger; and the restoration waveform has, in the one driving cycle, discharge pulses of a number larger than the number of the discharge pulses of any of the printing waveforms.

4. The liquid droplet discharge apparatus according to claim 3, wherein:

each of the printing waveforms includes: a pre-pulse positioned at a beginning of the one driving cycle; a cancel pulse positioned at an end of the one driving cycle; or both of the pre-pulse and the cancel pulse, in the one driving cycle; and the restoration waveform includes at least one driving cycle including none of the pre-pulse and the cancel pulse.

5. The liquid droplet discharge apparatus according to claim 1, further comprising a carriage configured to move the discharge head in a movement direction, wherein the controller is configured to:

calculate a moving discharge time required to complete the restoration of the recess in a case of causing the discharge head to discharge the liquid droplets while moving the carriage in the movement direction, and a stop discharge time required to complete the restoration of the recess in a case of causing the discharge head to discharge the liquid droplets in a state that the carriage is stopped;

restore the recess by causing the discharge head to discharge the liquid droplets while moving the carriage in the movement direction, under a condition that the moving discharge time is equal to or shorter than the stop discharge time; and restore the recess by causing the discharge head to discharge the liquid droplets in the state that the carriage is stopped, under a condition that the moving discharge time is longer than the stop discharge time.

6. The liquid droplet discharge apparatus according to claim 5, wherein:

the controller is configured to move the carriage at one movement speed, among a plurality of movement speeds, while causing the discharge head to discharge the liquid droplets; and the controller is configured to use a minimum value of the plurality of movement speeds in a case of calculating the moving discharge time.

7. The liquid droplet discharge apparatus according to claim 5, wherein:

the discharge head has a plurality of nozzle arrays arranged in the movement direction;

the nozzle arrays include a first nozzle array positioned at an endmost position on one side in the movement direction and a second nozzle array positioned at another endmost position on the other side in the movement direction; and in a case of restoring the recess by causing the discharge head to discharge the liquid droplets in the state that the carriage is stopped, the controller is configured to:

acquire a position of the recess on the printing medium;

execute the restoration of the recess in a state that the first nozzle array is positioned at an end portion, on the one side in the movement direction, of the recess; and under a condition that the second nozzle array is opposed to a division point of the recess in the state that the first nozzle array is positioned at the end portion of the recess, execute subsequent restoration of the recess in a state that the first nozzle array is positioned at the division point of the recess.

8. The liquid droplet discharge apparatus according to claim 5, wherein:

the liquid droplets are ultraviolet-curable type ink droplets, the liquid droplet discharge apparatus further comprises a light source unit carried on the carriage, the light source unit being configured to radiate an ultraviolet ray to cure the ultraviolet-curable type ink droplets discharged from the discharge nozzle, and the controller is configured to:

acquire second information about the surface of the printing medium by the surface information acquiring device after the ultraviolet-curable type ink droplets discharged to the recess are cured by the ultraviolet ray radiated from the light source unit;

calculate a depth of the recess after discharging the ultraviolet-curable type ink droplets to the recess based on the second information about the surface of the printing medium; and discharge the ultraviolet-curable type ink droplets to the recess again under a condition that the calculated depth is not less than 20 nm.

9. The liquid droplet discharge apparatus according to claim 1, wherein:

the discharge head includes, as the nozzle, a printing nozzle and a recess-restoring nozzle, the recess-restoring nozzle having a diameter of a nozzle hole larger than a diameter of a nozzle hole of the printing nozzle; and the controller is configured to cause the liquid droplets to be discharged from the recess-restoring nozzle when the recess is restored.

10. A liquid droplet discharge method comprising:

acquiring information about a surface of a printing medium;

calculating a volume of a recess on the printing medium based on the information about the surface of the printing medium;

generating a driving waveform for filling up the recess in accordance with the volume of the recess;

applying pressure to liquid contained in a pressure chamber communicated with a nozzle of a discharge head, by driving an actuator in accordance with the driving waveform such that liquid droplets are discharged from the nozzle to the recess; and printing at least part of an image on the printing medium with the discharge head.

11. A non-transitory medium storing a liquid droplet discharge program to be executed by a controller of a liquid droplet discharge apparatus, the liquid droplet discharge apparatus comprising a discharge head having a nozzle and an actuator, the nozzle being configured to discharge liquid droplets onto a printing medium, the actuator being configured to apply pressure to liquid contained in a pressure chamber communicated with the nozzle, a waveform generating circuit configured to generate driving waveforms of signals for driving the actuator, a surface information acquiring device configured to acquire information about a surface of the printing medium, and the controller, wherein the liquid droplet discharge program causes the controller to execute:

a calculating process for calculating a volume of a recess on the printing medium based on the information acquired by the surface information acquiring device;

a restoration waveform generation instructing process for causing the waveform generating circuit to generate a driving waveform for filling up the recess in accordance with the volume of the recess;

a recess restoration instructing process for driving the actuator in accordance with the driving waveform generated by the waveform generating circuit such that the liquid droplets are discharged from the nozzle to the recess; and a printing process for printing at least part of an image on the printing medium with the discharge head.

* * * * *